(12) United States Patent
Lajewardi et al.

(10) Patent No.: US 11,105,361 B2
(45) Date of Patent: Aug. 31, 2021

(54) SCREW-TYPE FASTENER

(71) Applicant: THE HILLMAN GROUP, INC., Cincinnati, OH (US)

(72) Inventors: Farhad Lajewardi, Toronto (CA); Michael K. Falkenstein, Toronto (CA); Beesham Mahadeo, Ontario (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 233 days.

(21) Appl. No.: 16/168,154

(22) Filed: Oct. 23, 2018

(65) Prior Publication Data

US 2019/0136897 A1 May 9, 2019

Related U.S. Application Data

(60) Provisional application No. 62/581,271, filed on Nov. 3, 2017.

(51) Int. Cl.
*F16B 25/00* (2006.01)
*F16B 35/06* (2006.01)
*F16B 35/04* (2006.01)

(52) U.S. Cl.
CPC ...... *F16B 25/0052* (2013.01); *F16B 25/0015* (2013.01); *F16B 25/0068* (2013.01);
(Continued)

(58) Field of Classification Search
CPC ...... F16B 35/065; F16B 35/048; F16B 35/06; F16B 39/282; F16B 33/002; F16B 25/0015; F16B 25/0068; F16B 25/0084
(Continued)

(56) References Cited

U.S. PATENT DOCUMENTS

| 1,151,861 A | 8/1915 | Brumback |
| 3,136,205 A | 6/1964 | Ansingh |

(Continued)

FOREIGN PATENT DOCUMENTS

| EP | 3569878 A1 * | 11/2019 | .......... F16B 25/0015 |
| GB | 1357720 | 6/1974 | |

(Continued)

OTHER PUBLICATIONS

NPL#1: Aspen Fasteners—Wood Screws, Aspen Fasteners, Sep. 16, 2012, p. 2, <https://web.archive.org/web/20120916060359/http://www.aspenfasteners.com/v/vspfiles/files/docs/woodscrew_spec_sheet.pdf> (Year: 2012).*

(Continued)

*Primary Examiner* — Victor D Batson
*Assistant Examiner* — Amit Singh Dhillon
(74) *Attorney, Agent, or Firm* — Thompson Hine LLP

(57) ABSTRACT

A screw includes: a head end, a shank and a tapered end, the head end including a tool engaging part, the head end located at one end of the shank and the tapered end located at an opposite end of the shank, wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head includes an underside formed by a frustoconical part with a plurality of nibs. The head may also include an outer ledge.

11 Claims, 32 Drawing Sheets

(52) U.S. Cl.
CPC ........ *F16B 35/065* (2013.01); *F16B 25/0084* (2013.01); *F16B 35/048* (2013.01)

(58) Field of Classification Search
USPC .......................................... 411/399, 187, 188
See application file for complete search history.

(56) References Cited

U.S. PATENT DOCUMENTS

| | | | |
|---|---|---|---|
| 3,246,556 A | 4/1966 | Phipard, Jr. | |
| 3,903,784 A | 9/1975 | Dekker | |
| 4,323,326 A | 4/1982 | Okada et al. | |
| 4,655,661 A | 4/1987 | Brandt | |
| 4,697,969 A | 10/1987 | Sparkes | |
| 5,249,882 A | 10/1993 | Nagoshi et al. | |
| 5,516,248 A | 5/1996 | DeHaitre | |
| 5,683,217 A * | 11/1997 | Walther | F16B 35/06 411/399 |
| 5,722,376 A | 3/1998 | Sweeten | |
| 5,827,030 A | 10/1998 | Dicke | |
| 5,897,280 A | 4/1999 | Dicke | |
| 6,015,252 A | 1/2000 | Peck | |
| 6,106,208 A | 8/2000 | Lin | |
| 6,152,666 A | 11/2000 | Walther et al. | |
| 6,250,866 B1 | 6/2001 | Devine | |
| 6,332,741 B1 | 12/2001 | Janusz | |
| 6,394,725 B1 | 5/2002 | Dicke | |
| 6,402,448 B1 | 6/2002 | Dicke | |
| 6,428,259 B1 | 8/2002 | Yu | |
| 6,616,391 B1 | 9/2003 | Druschel | |
| 6,666,638 B2 | 12/2003 | Craven | |
| 6,698,987 B1 | 3/2004 | Dicke | |
| 6,699,421 B2 | 3/2004 | Shimizu et al. | |
| 6,789,989 B2 | 9/2004 | Walther | |
| 6,789,991 B2 | 9/2004 | Hsu | |
| 6,926,484 B2 * | 8/2005 | Kram | F16B 25/0031 411/311 |
| 6,941,635 B2 | 9/2005 | Craven | |
| 6,966,737 B2 | 11/2005 | McGovern et al. | |
| 7,037,059 B2 | 5/2006 | Dicke | |
| 7,101,133 B2 | 9/2006 | Dicke | |
| 7,118,317 B2 | 10/2006 | Hofschneider | |
| 7,255,523 B2 | 8/2007 | Laan | |
| 7,293,947 B2 | 11/2007 | Craven | |
| 7,334,976 B2 | 2/2008 | Dicke | |
| 7,399,150 B2 | 7/2008 | Hofschneider | |
| 7,604,445 B1 | 10/2009 | Dicke | |
| 7,677,854 B2 | 3/2010 | Langewiesche | |
| 7,682,119 B2 | 3/2010 | Chen | |
| 7,682,182 B2 | 3/2010 | Kondo et al. | |
| 7,695,228 B2 | 4/2010 | Craven | |
| 7,699,569 B2 | 4/2010 | Su | |
| 7,785,055 B2 | 8/2010 | Dicke et al. | |
| 7,862,279 B2 | 1/2011 | Stiebitz et al. | |
| 7,862,280 B2 | 1/2011 | Su | |
| 7,988,396 B2 | 8/2011 | Weiss et al. | |
| 8,104,248 B2 | 1/2012 | Gillis et al. | |
| 8,137,042 B2 | 3/2012 | Severns | |
| 8,192,123 B2 * | 6/2012 | Ernst | F16B 25/0026 411/387.1 |
| 8,348,571 B2 | 1/2013 | Shih | |
| 8,348,575 B2 | 1/2013 | Walther | |
| 8,360,702 B2 | 1/2013 | Yu | |
| 8,382,414 B2 | 2/2013 | Vandenberg | |
| 8,408,855 B2 | 4/2013 | Stiebitz et al. | |
| 8,430,618 B2 | 4/2013 | Baer | |
| 8,480,342 B2 | 7/2013 | Stiebitz et al. | |
| 8,511,958 B2 | 8/2013 | Chang | |
| 8,591,159 B2 | 11/2013 | Walther | |
| 8,740,531 B2 | 6/2014 | Su | |
| 8,858,145 B2 | 10/2014 | Su | |
| 8,864,430 B2 | 10/2014 | Su | |
| 8,864,431 B2 | 10/2014 | Su | |
| 8,944,734 B2 | 2/2015 | Su | |
| 9,145,911 B2 | 9/2015 | Shih | |
| 9,163,654 B2 | 10/2015 | Barenski, Jr. et al. | |
| 9,581,183 B2 | 2/2017 | Lajewardi | |
| 2001/0038781 A1 | 11/2001 | Mallet et al. | |
| 2004/0071524 A1 * | 4/2004 | Habermehl | F16B 25/0015 411/399 |
| 2005/0226701 A1 * | 10/2005 | Craven | F16B 35/048 411/399 |
| 2006/0207204 A1 * | 9/2006 | Wasitis | F16B 25/103 52/410 |
| 2007/0036632 A1 | 2/2007 | Lin | |
| 2007/0269287 A1 * | 11/2007 | Runge | F16B 25/0015 411/378 |
| 2008/0031705 A1 | 2/2008 | Severns | |
| 2010/0158634 A1 | 6/2010 | Walther | |
| 2011/0064540 A1 | 3/2011 | Walther | |
| 2012/0186067 A1 | 7/2012 | Walther | |
| 2012/0207564 A1 * | 8/2012 | Kochheiser | F16B 25/0031 411/412 |
| 2013/0039720 A1 | 2/2013 | Shih | |
| 2013/0302110 A1 * | 11/2013 | Park | F16B 25/0068 411/387.1 |
| 2014/0064878 A1 | 3/2014 | Su et al. | |
| 2014/0178150 A1 | 6/2014 | Su et al. | |
| 2015/0050101 A1 * | 2/2015 | Shih | F16B 25/0052 411/411 |
| 2015/0063947 A1 * | 3/2015 | Huang | F16B 35/065 411/393 |
| 2015/0147137 A1 * | 5/2015 | Ban | F16B 25/0015 411/387.8 |
| 2015/0184685 A1 | 7/2015 | Su et al. | |
| 2016/0238053 A1 * | 8/2016 | Lajewardi | F16B 25/00 |
| 2016/0265578 A1 * | 9/2016 | Lin | F16B 35/065 |
| 2016/0290381 A1 * | 10/2016 | Park | F16B 25/0042 |
| 2016/0290382 A1 * | 10/2016 | Dill | F16B 35/065 |
| 2017/0284447 A1 | 10/2017 | Falkenstein | |
| 2018/0080491 A1 * | 3/2018 | Scheerer | F16B 25/103 |

FOREIGN PATENT DOCUMENTS

| | | | | |
|---|---|---|---|---|
| GB | 1357720 A | * | 6/1974 | ......... F16B 25/0047 |
| WO | WO-2019086091 A | * | 5/2019 | ............ F16B 35/065 |

OTHER PUBLICATIONS

PCT, International Search Report and Written Opinion, International Application No. PCT/US2018/057003; dated Jan. 3, 2019, 11 pages.

* cited by examiner

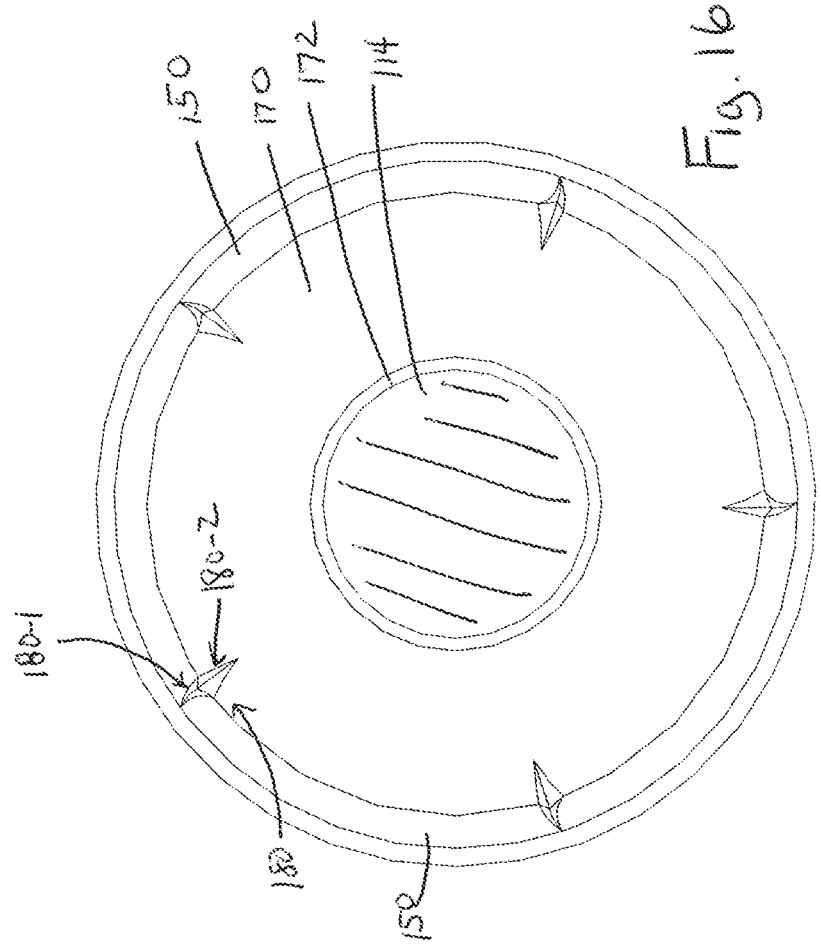

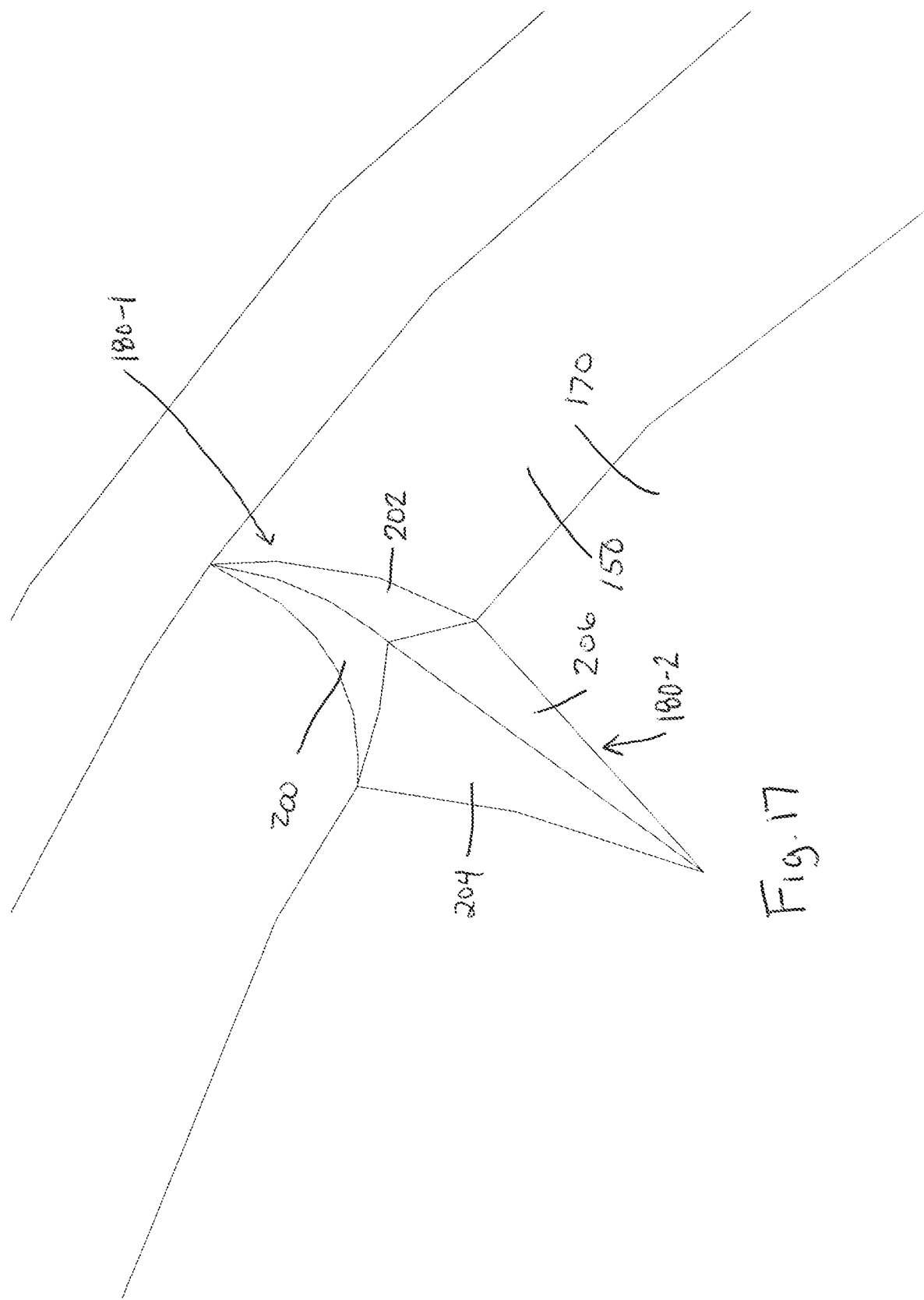

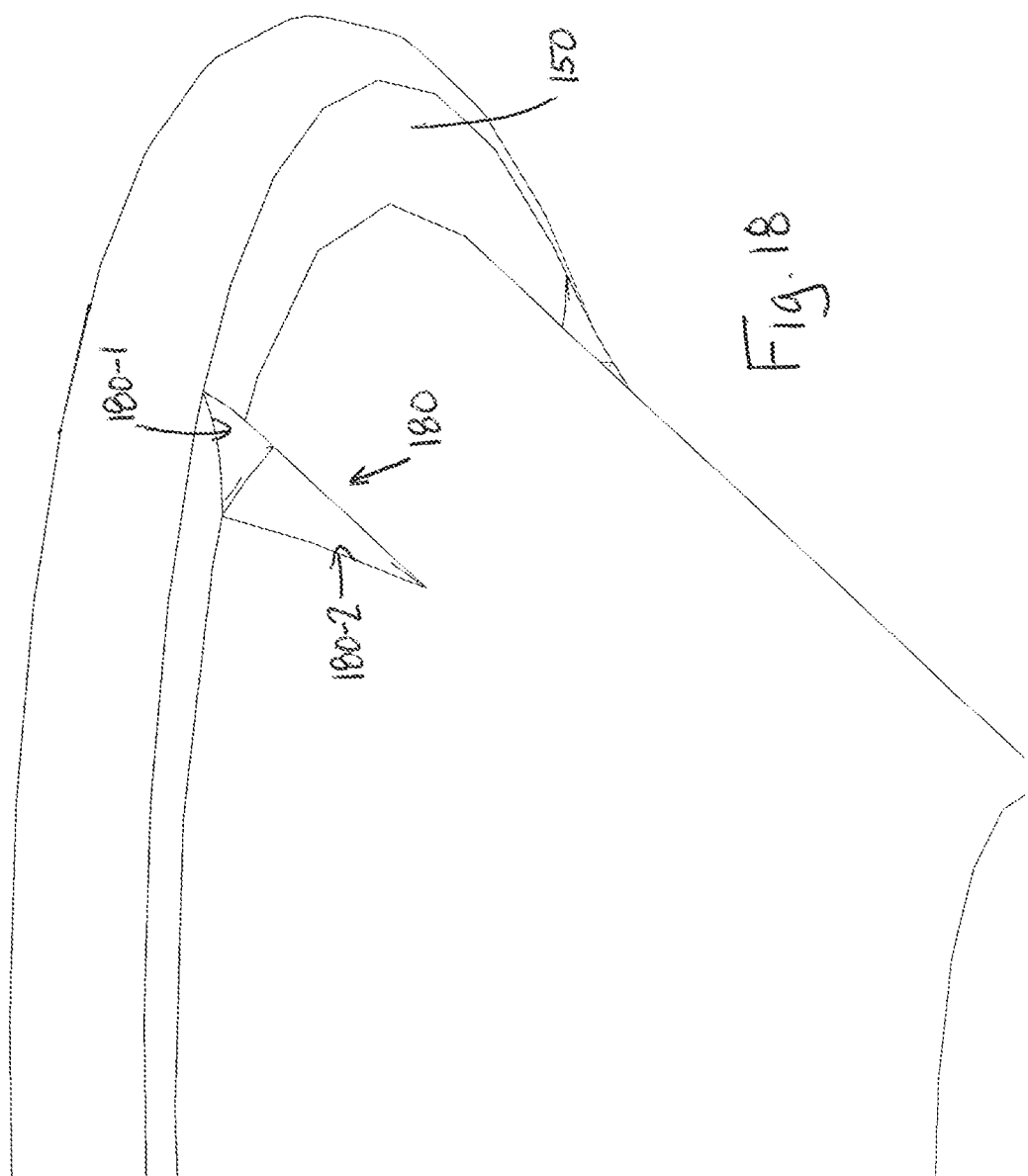

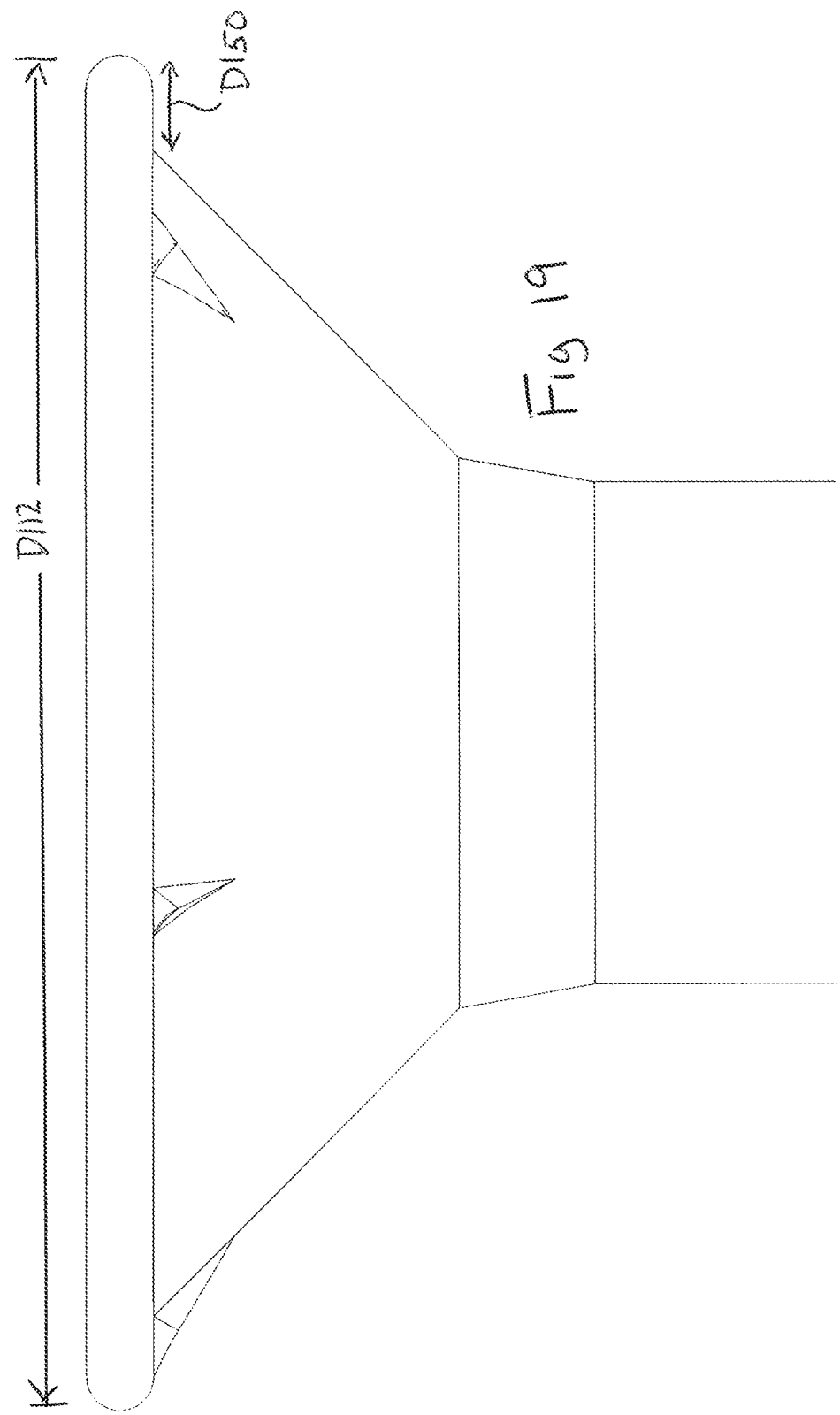

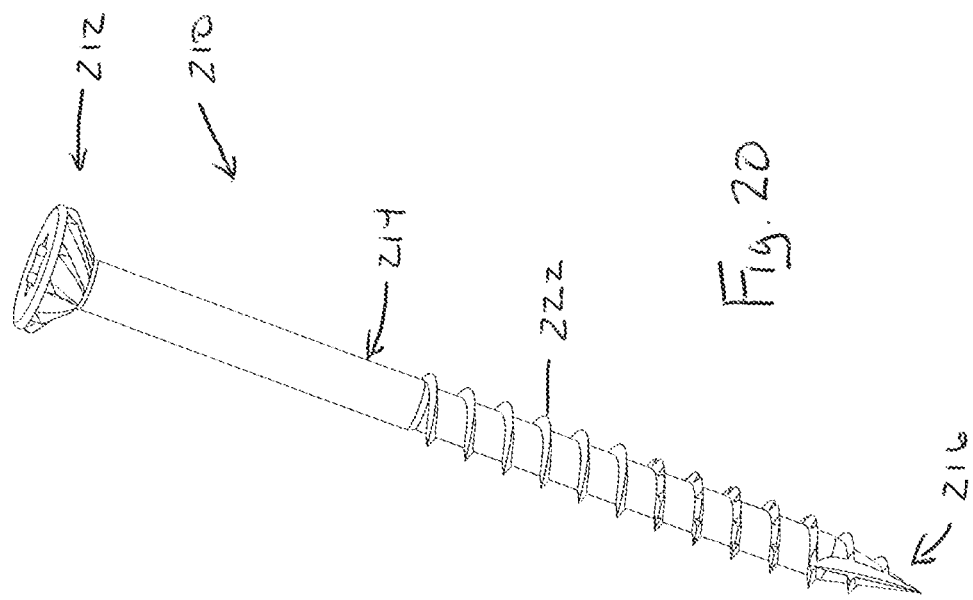

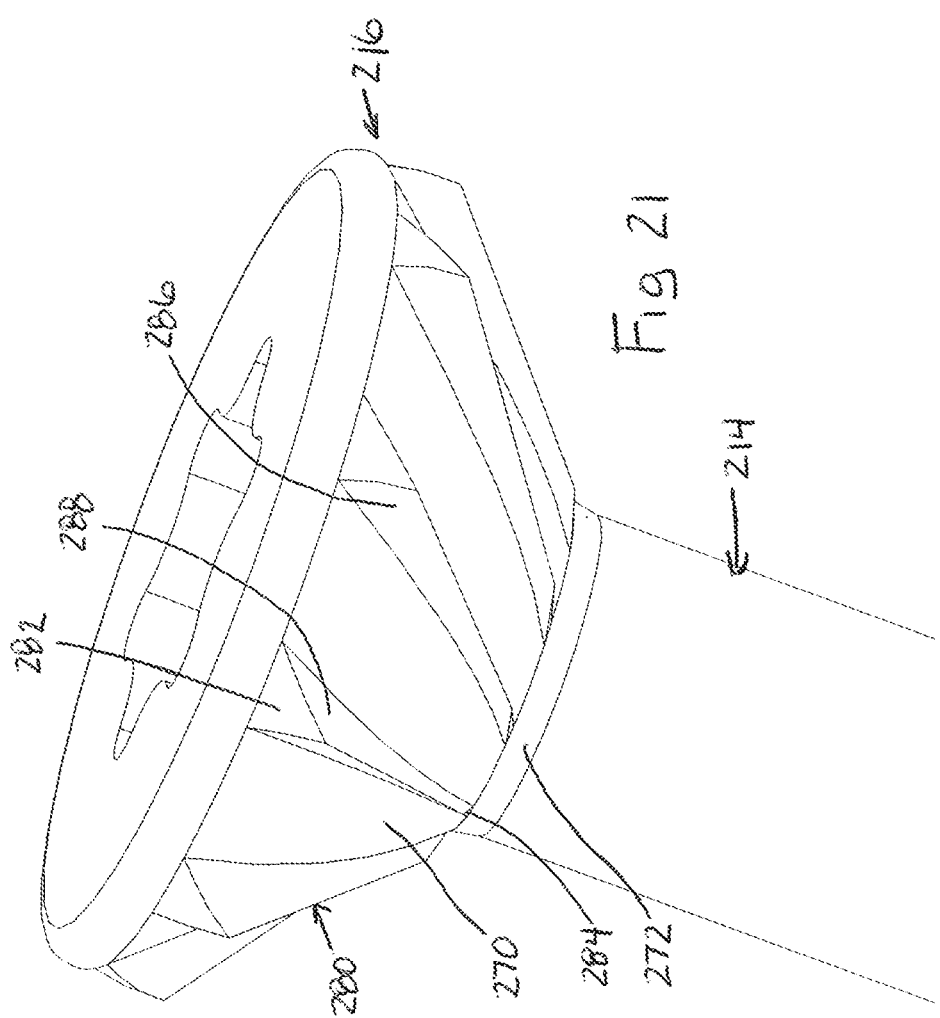

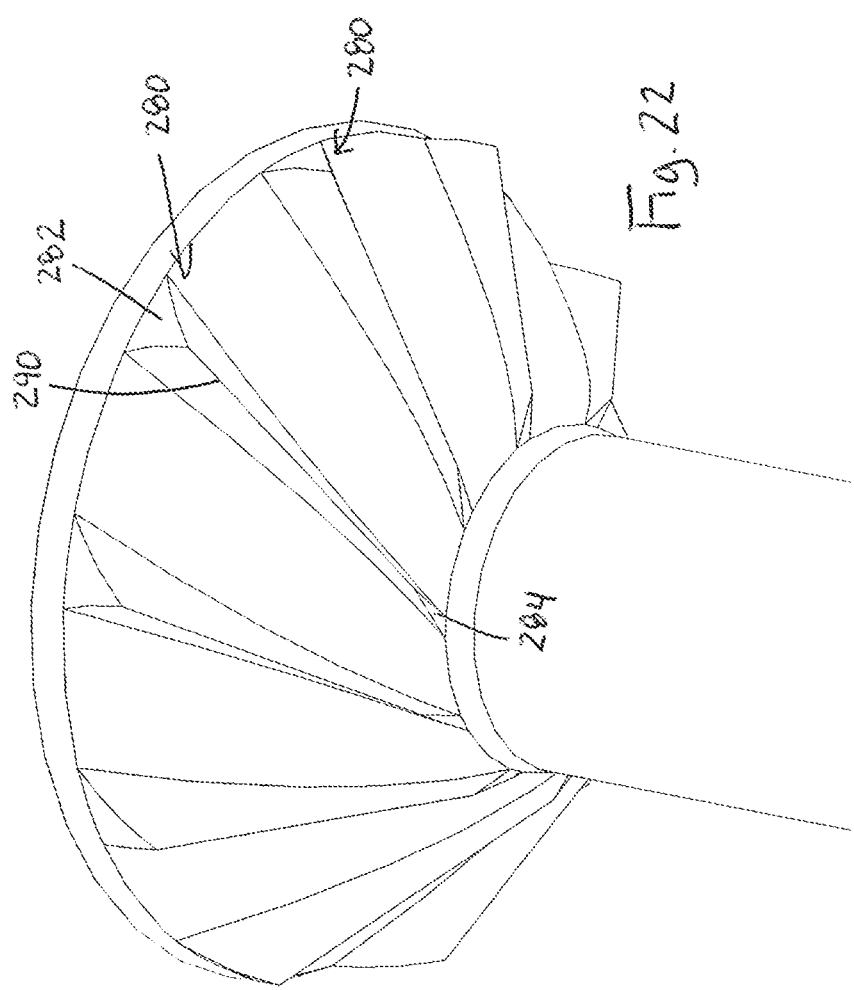

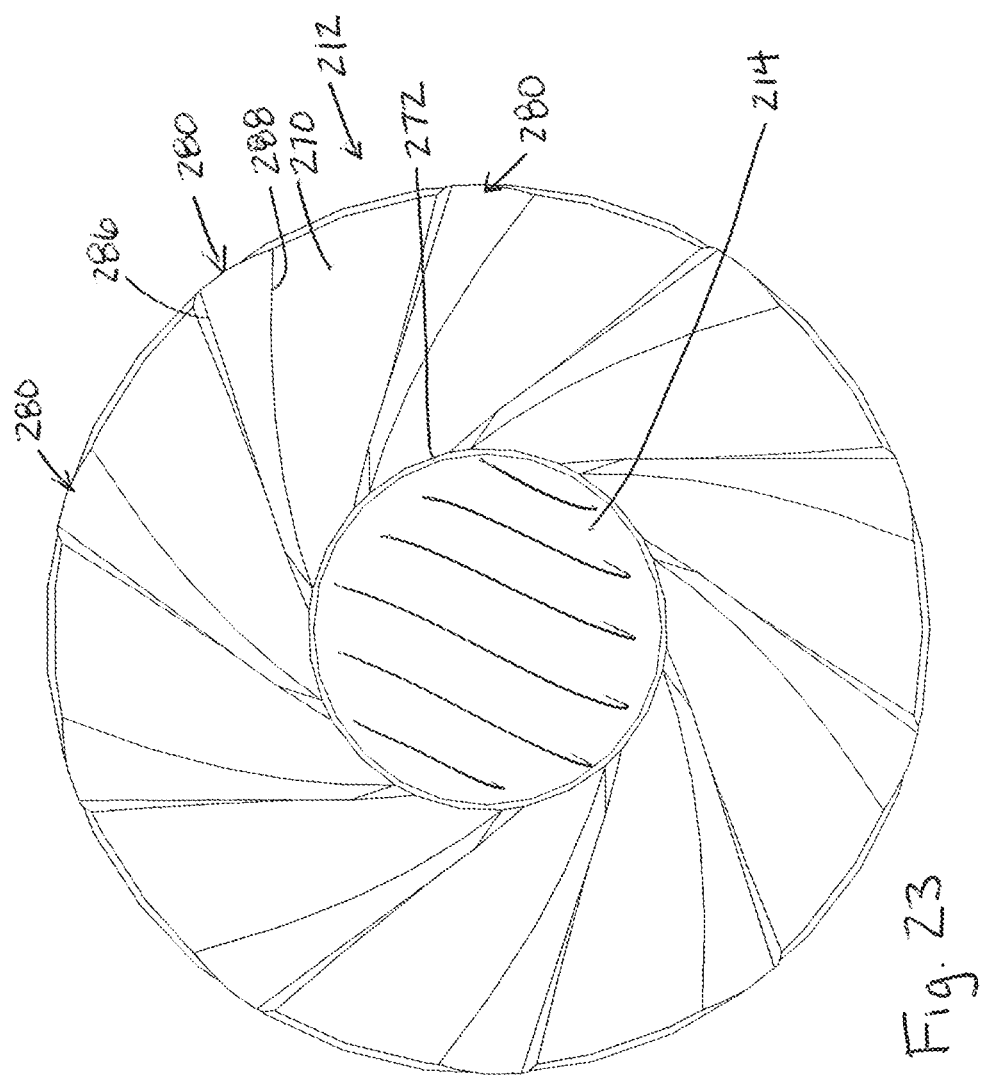

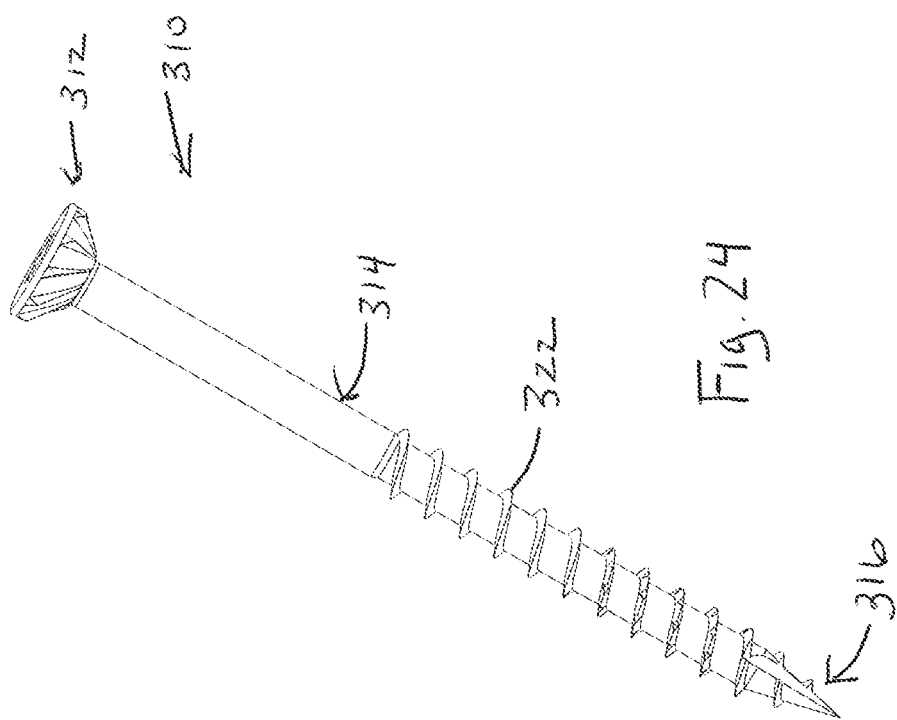

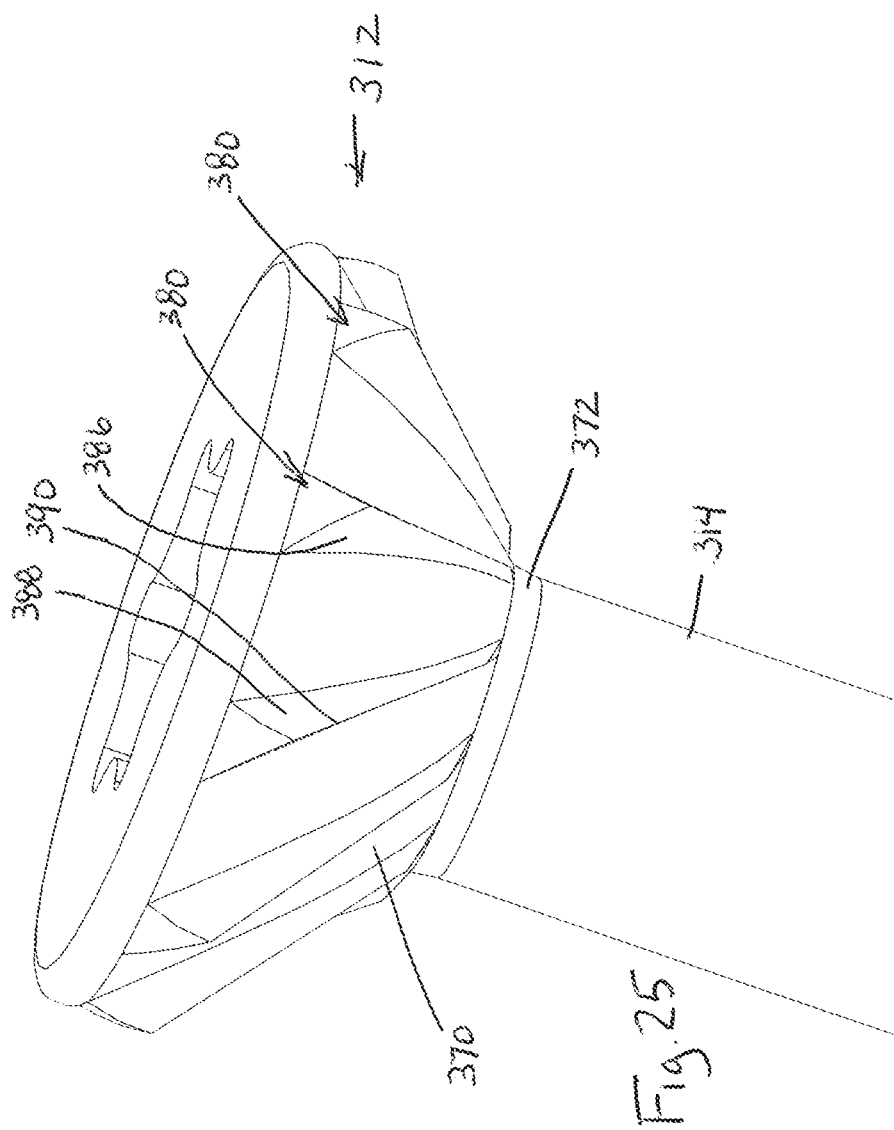

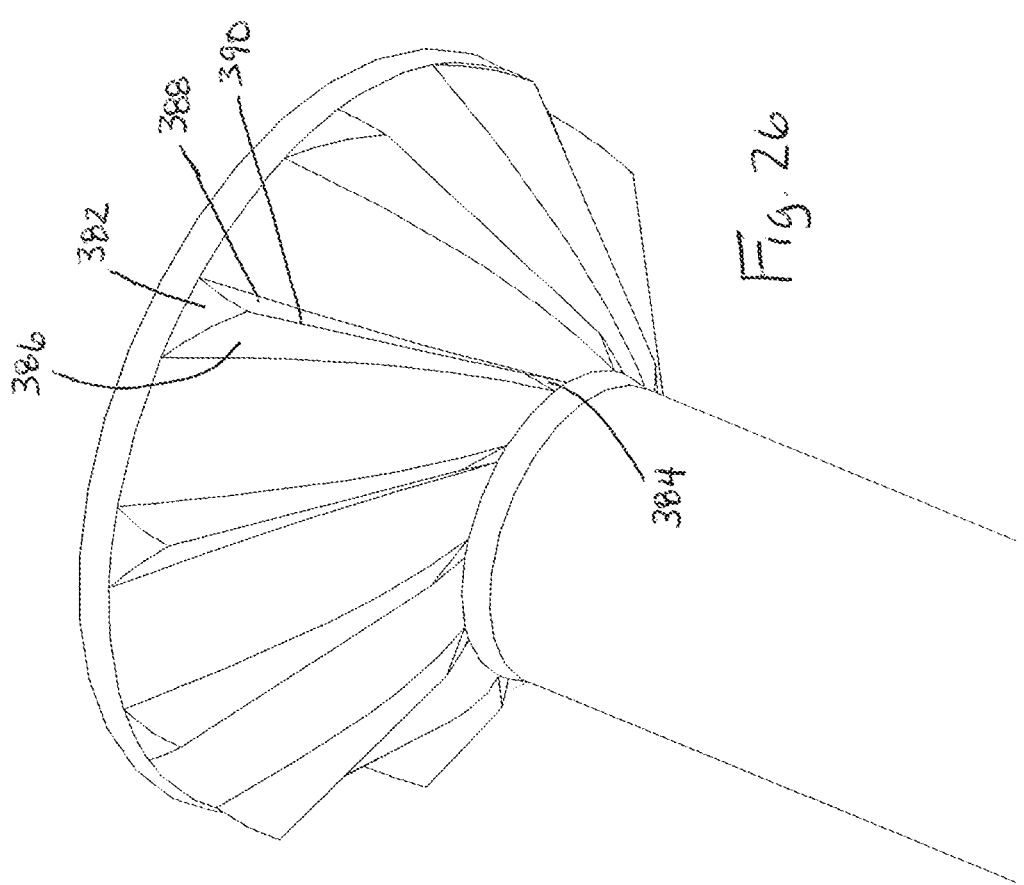

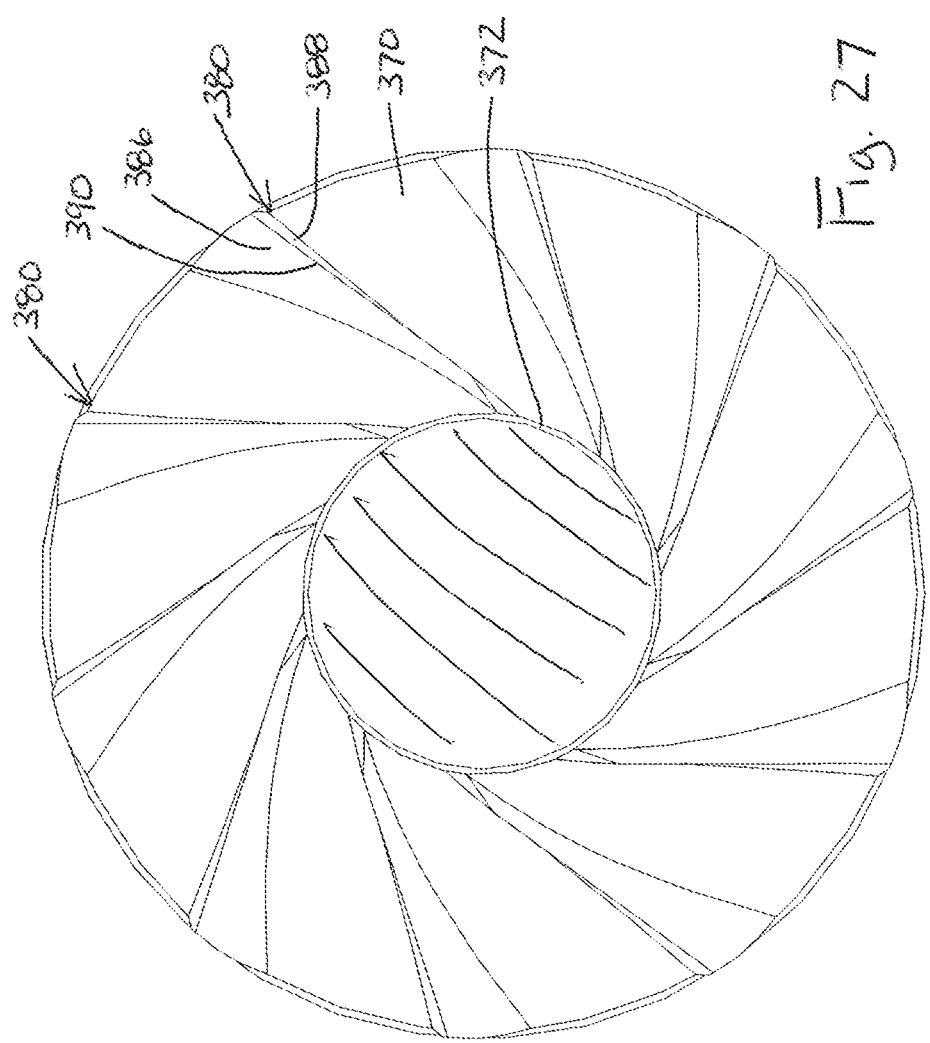

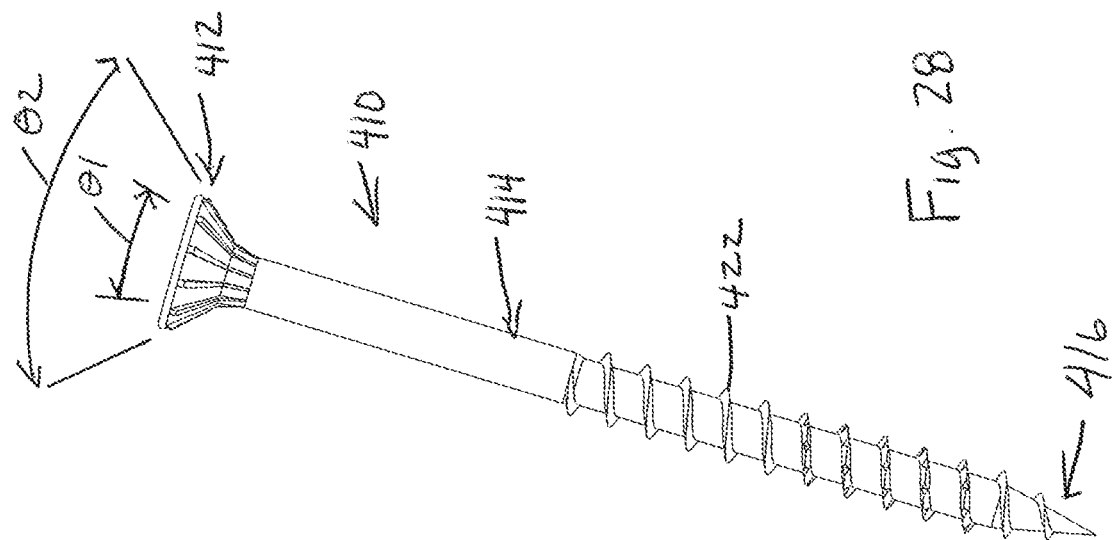

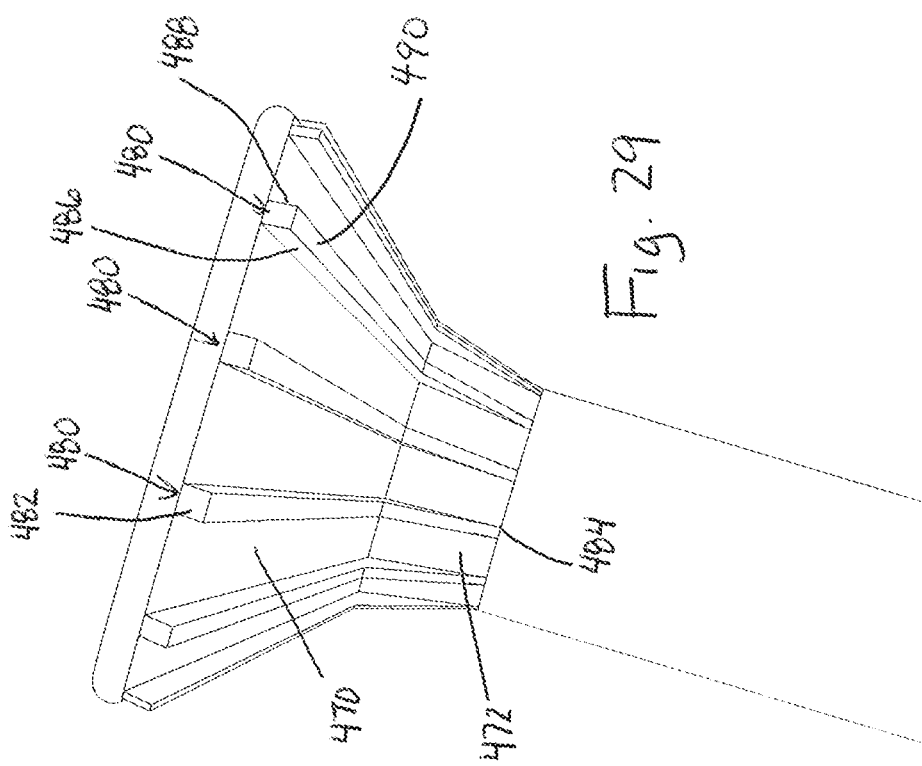

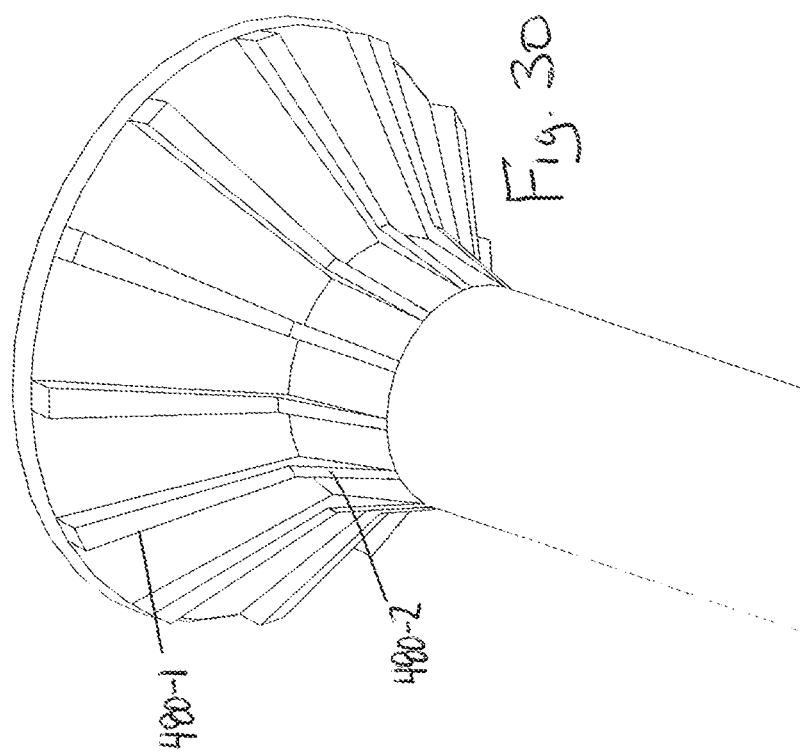

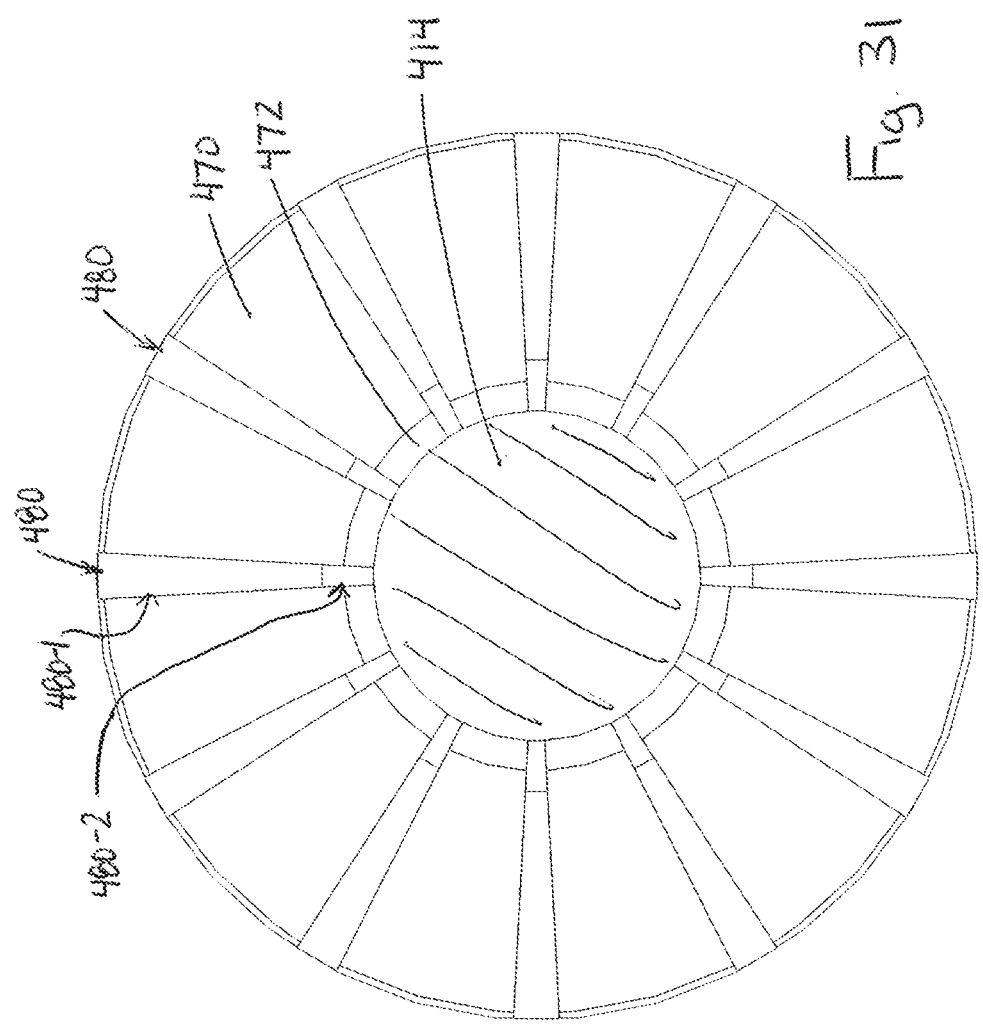

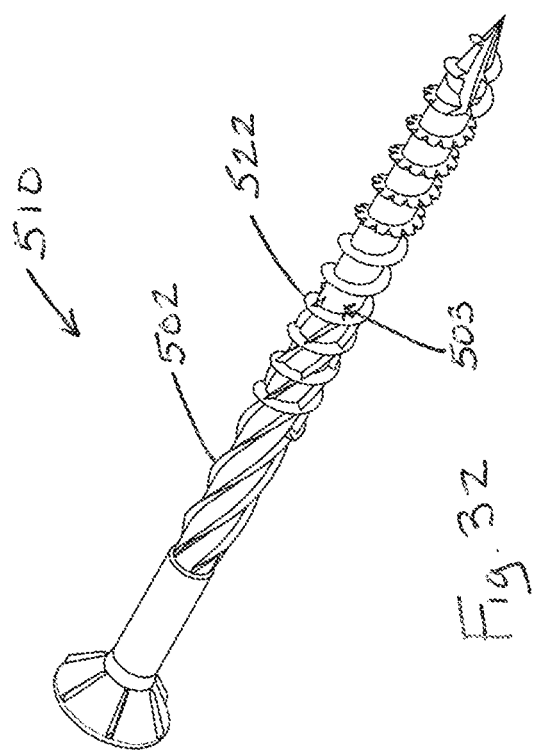

SCREW-TYPE FASTENER

TECHNICAL FIELD

This application relates generally to threaded fasteners, and more particularly, to a threaded wood screw.

BACKGROUND

A typical screw configuration includes an elongated shank that extends between a driving head of the screw and a pointed end of the screw. At least part of the shank is helically threaded. Wood screws with a variety of configurations are known. However, improvements upon self-drilling speed, torque to seat and removal torque are continuously sought.

It would be desirable to provide a cost-effective wood screw configuration that facilitates quick and effective installation.

SUMMARY

In one aspect, a screw comprises: a head end, a shank and a tapered end, the head end including a tool engaging part, the head end located at one end of the shank and the tapered end located at an opposite end of the shank, wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head includes an underside formed by a frustoconical part with a plurality of nibs.

In another aspect, a screw, comprises: a head end, a shank and a tapered end, the head end including a tool engaging part, the head end located at one end of the shank and the tapered end located at an opposite end of the shank, wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head includes an underside formed by a frustoconical part, and further includes an annular ledge extending radially outward beyond a perimeter of the frustoconical part.

In a further aspect, a screw comprises: a head end, a shank and a tapered end, the head end including a tool engaging part, the head end located at one end of the shank and the tapered end located at an opposite end of the shank, wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head includes an underside formed by a frustoconical part with a plurality of nibs; wherein the shank includes an unthreaded portion between the set location and the head end, wherein an axial length of the unthreaded portion is no more than about ninety percent of a combined axial length of the tapered end and the threaded portion of the shank.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 13-19 show views of another embodiment of a screw;
FIGS. 20-23 show views of another embodiment of a screw;
FIGS. 24-27 show views of another embodiment of a screw;
FIGS. 28-31 show views of another embodiment of a screw;
and
FIG. 32 shows another embodiment of a screw.

DETAILED DESCRIPTION

Figure 1:
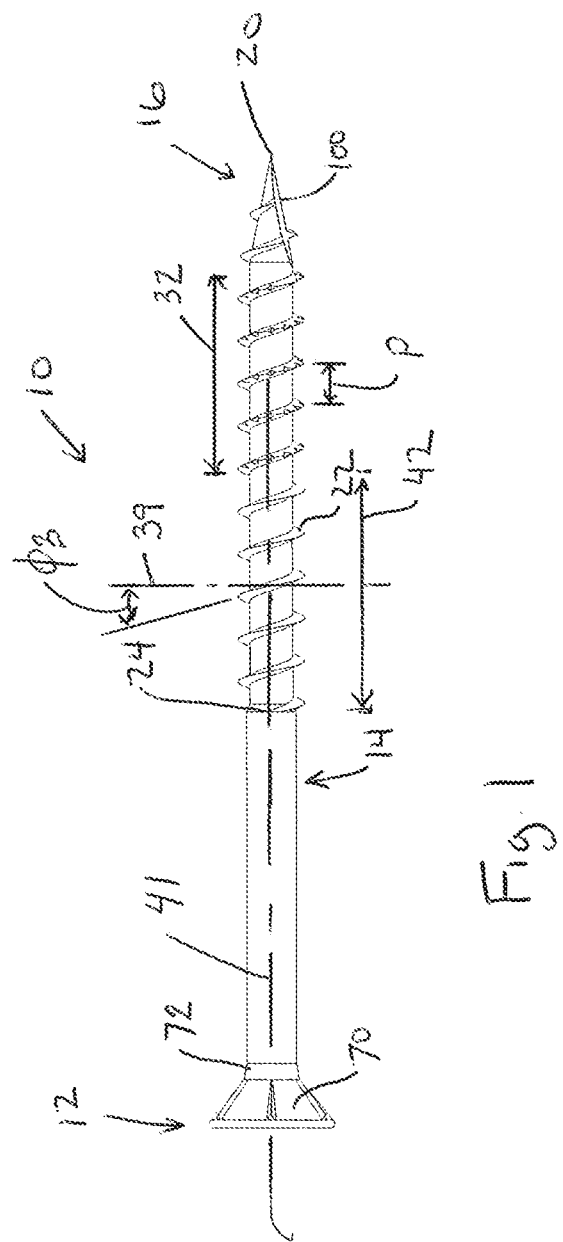
FIG. 1 shows a side elevation of one embodiment of a screw.
Figure 2:
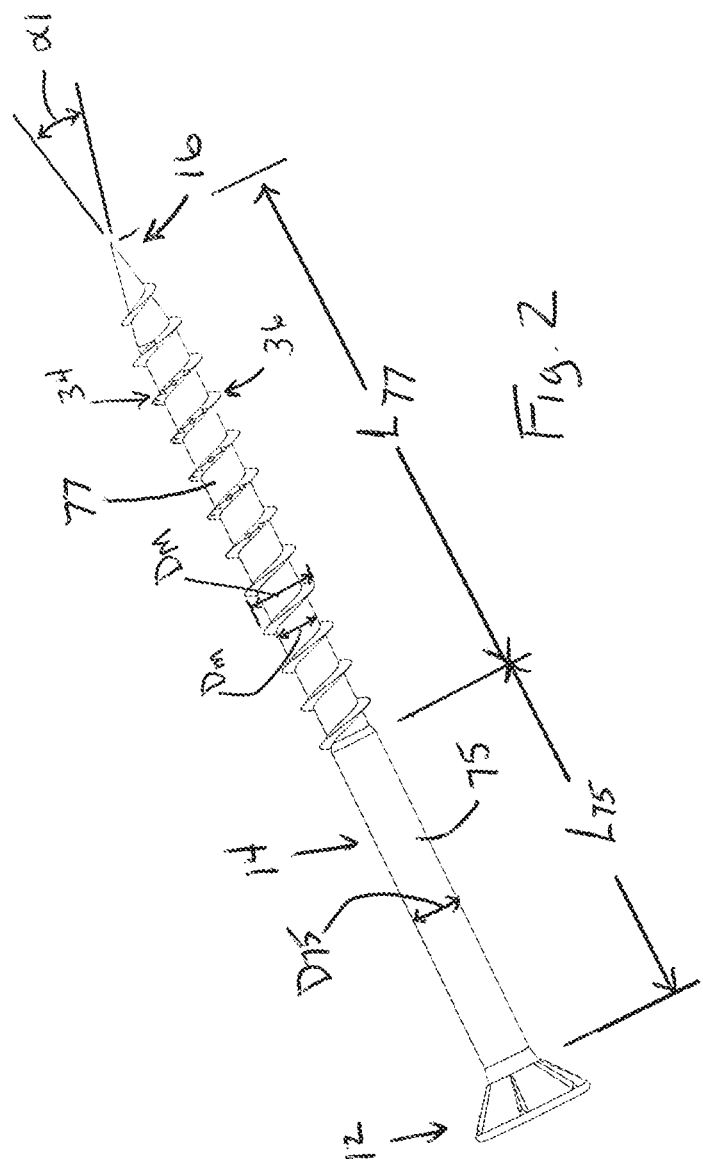
FIG. 2 shows another side elevation of the screw.
Figure 3:
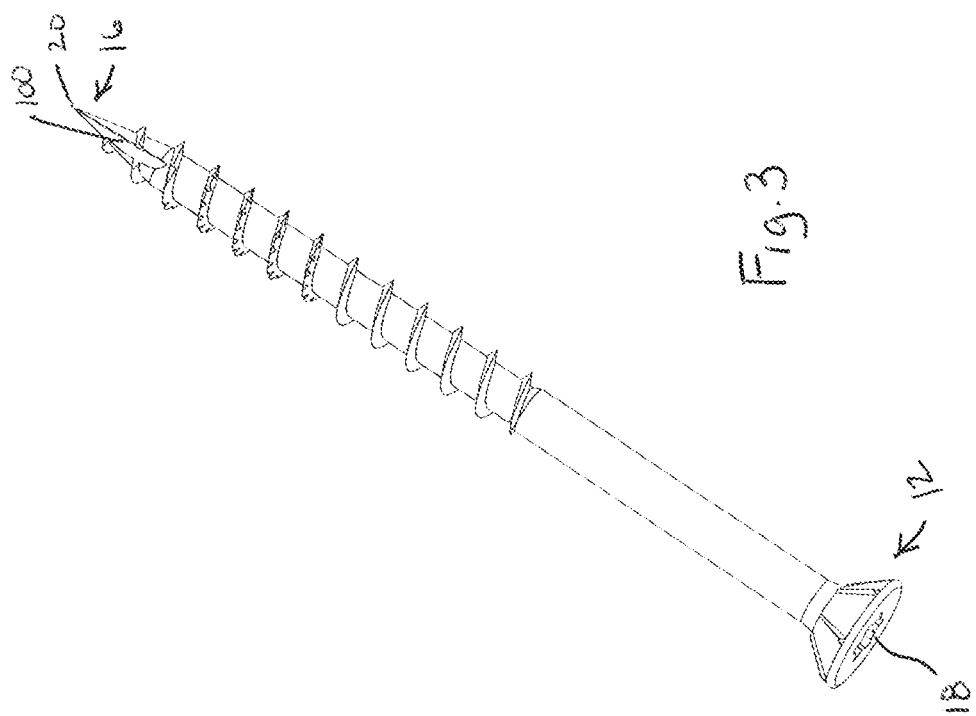
FIG. 3 shows a perspective view of the screw.
Figure 4:
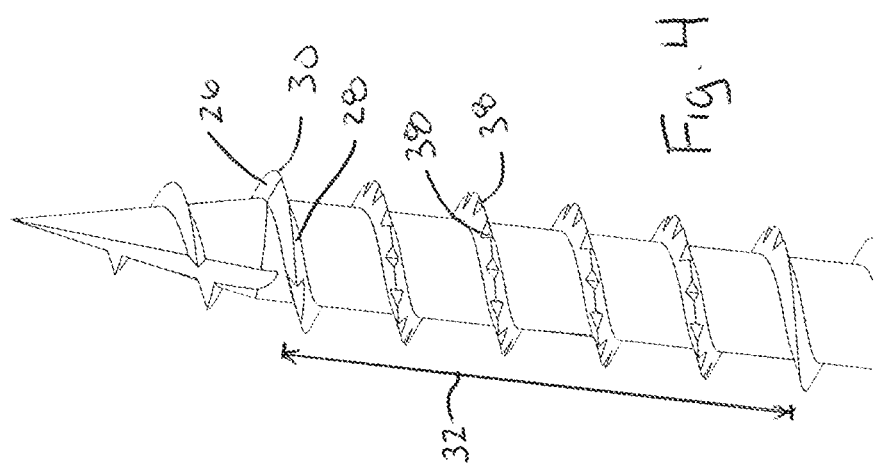
FIG. 4 shows a partial perspective view of the screw.
Figure 5:
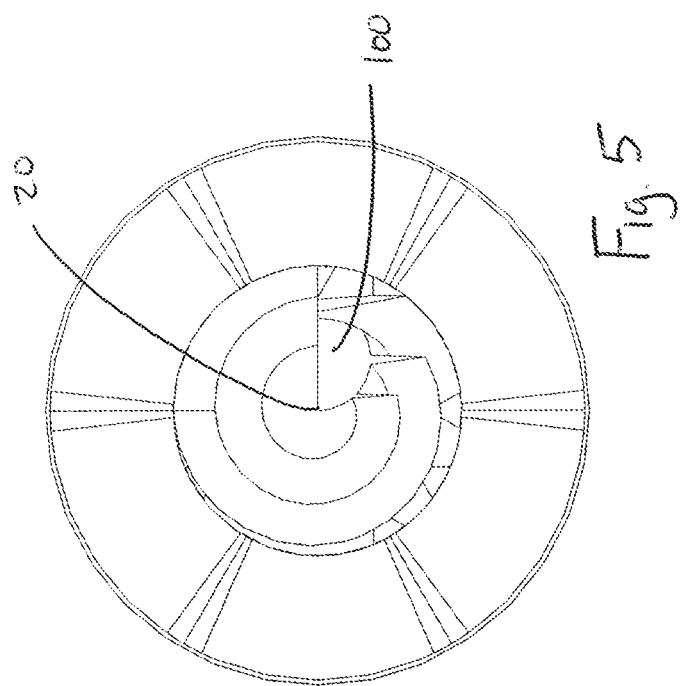
FIG. 5 shows a point end view of the screw.
Figure 6:
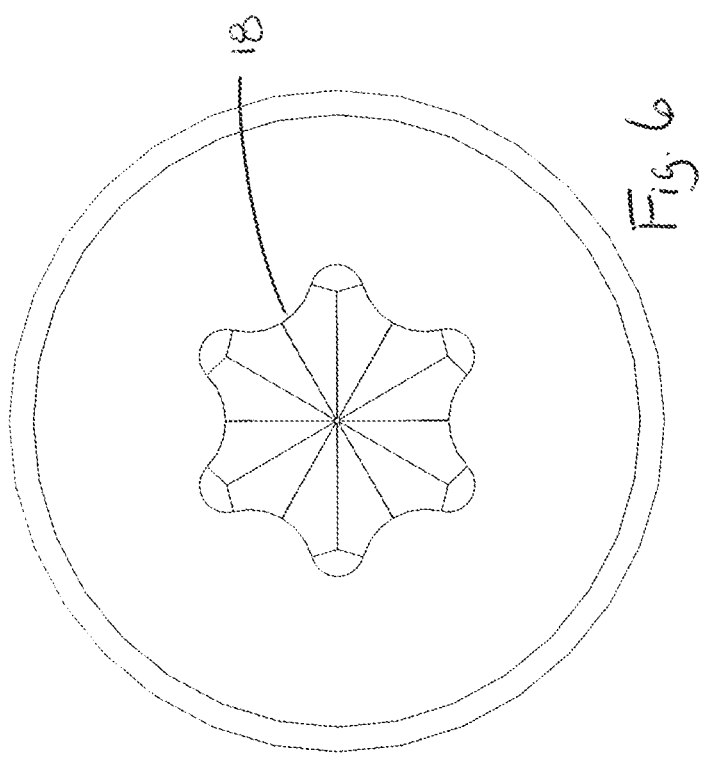
FIG. 6 shows a head end view of the screw.
Figure 7:
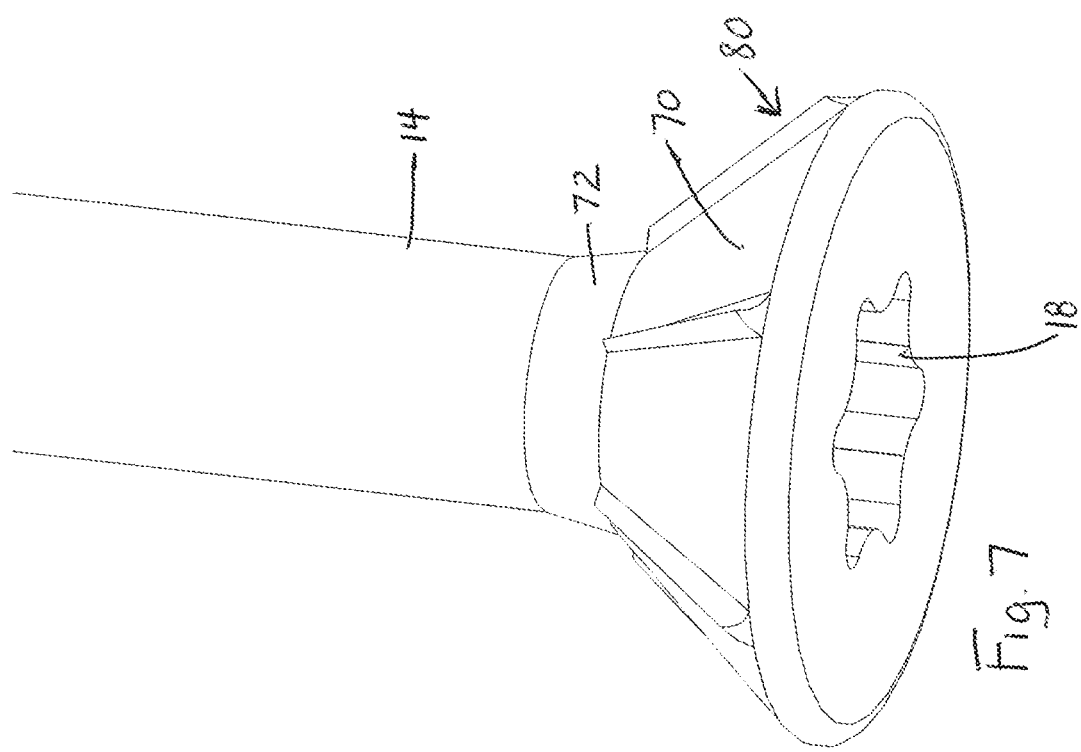
FIG. 7 shows a partial perspective view of the screw.
Figure 8:
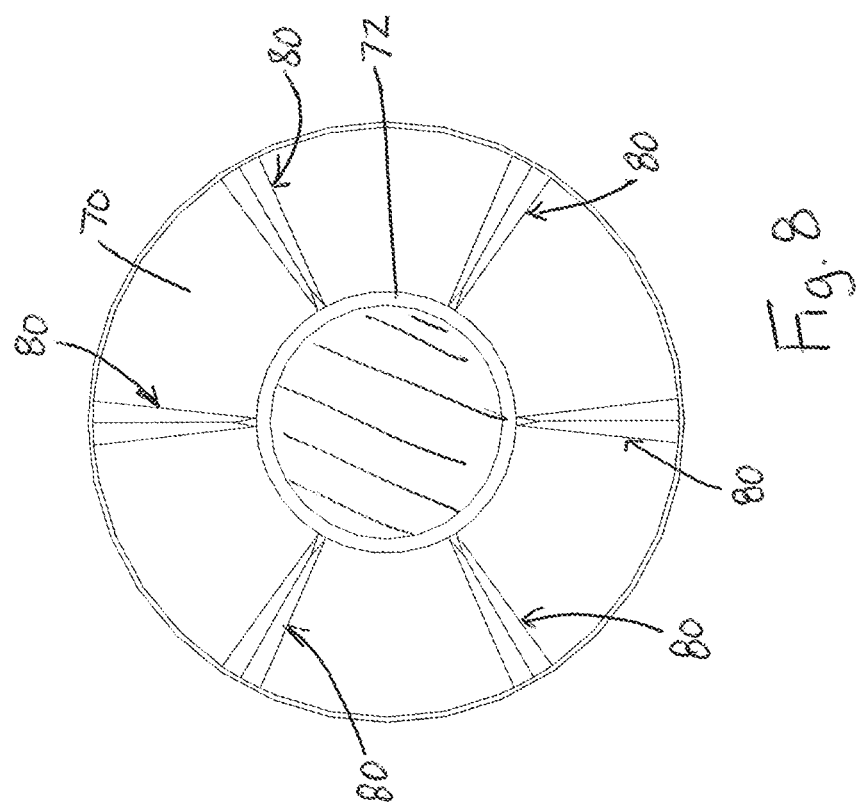
FIG. 8 shows a cross-section view taken along a plane perpendicular to the axis of the screw and looking at the underside of the head end of the screw.
Figure 9:
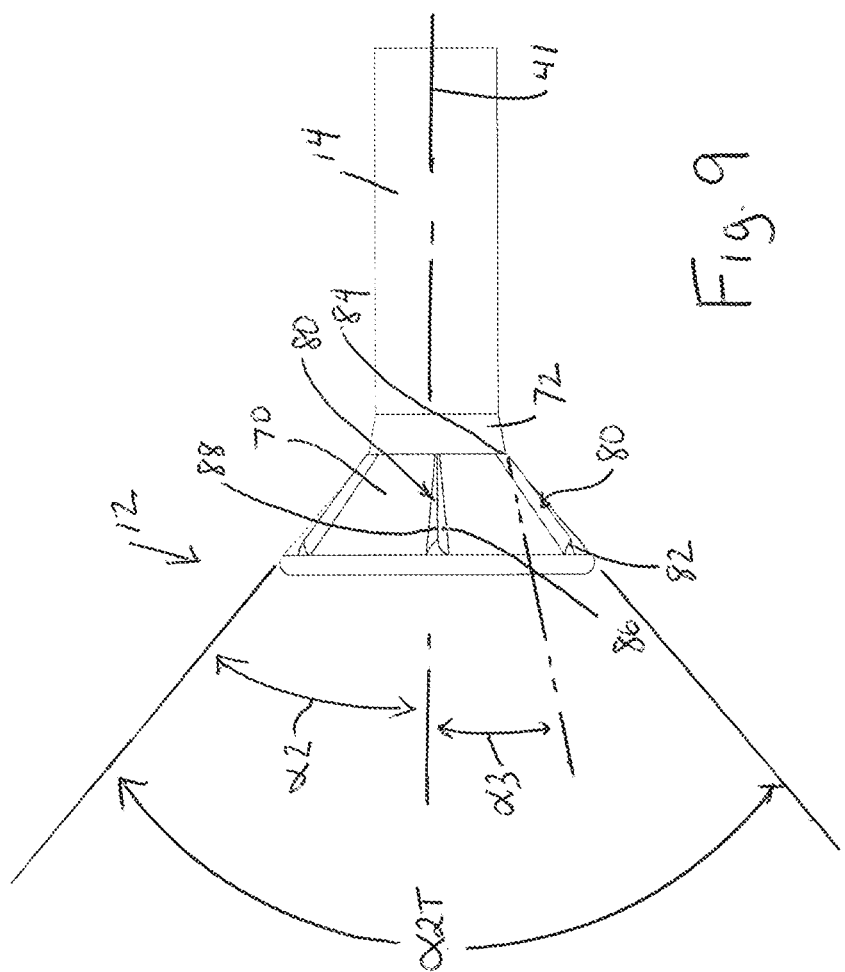
FIG. 9 shows a partial side elevation of the screw.
Figure 10:
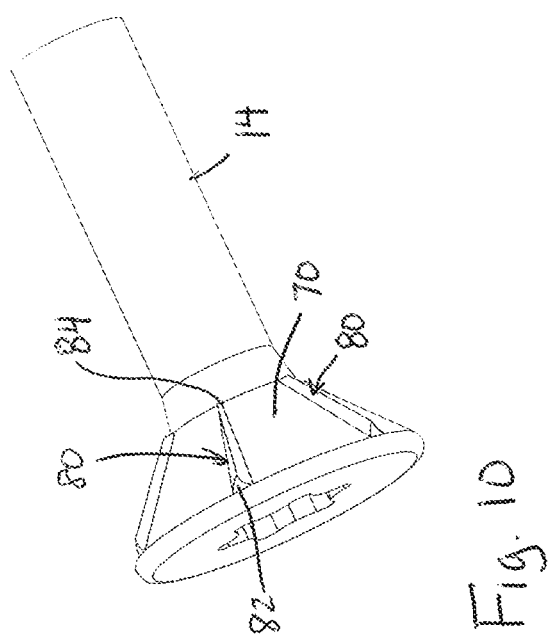
FIG. 10 shows a partial perspective view of the screw.
Figure 11:
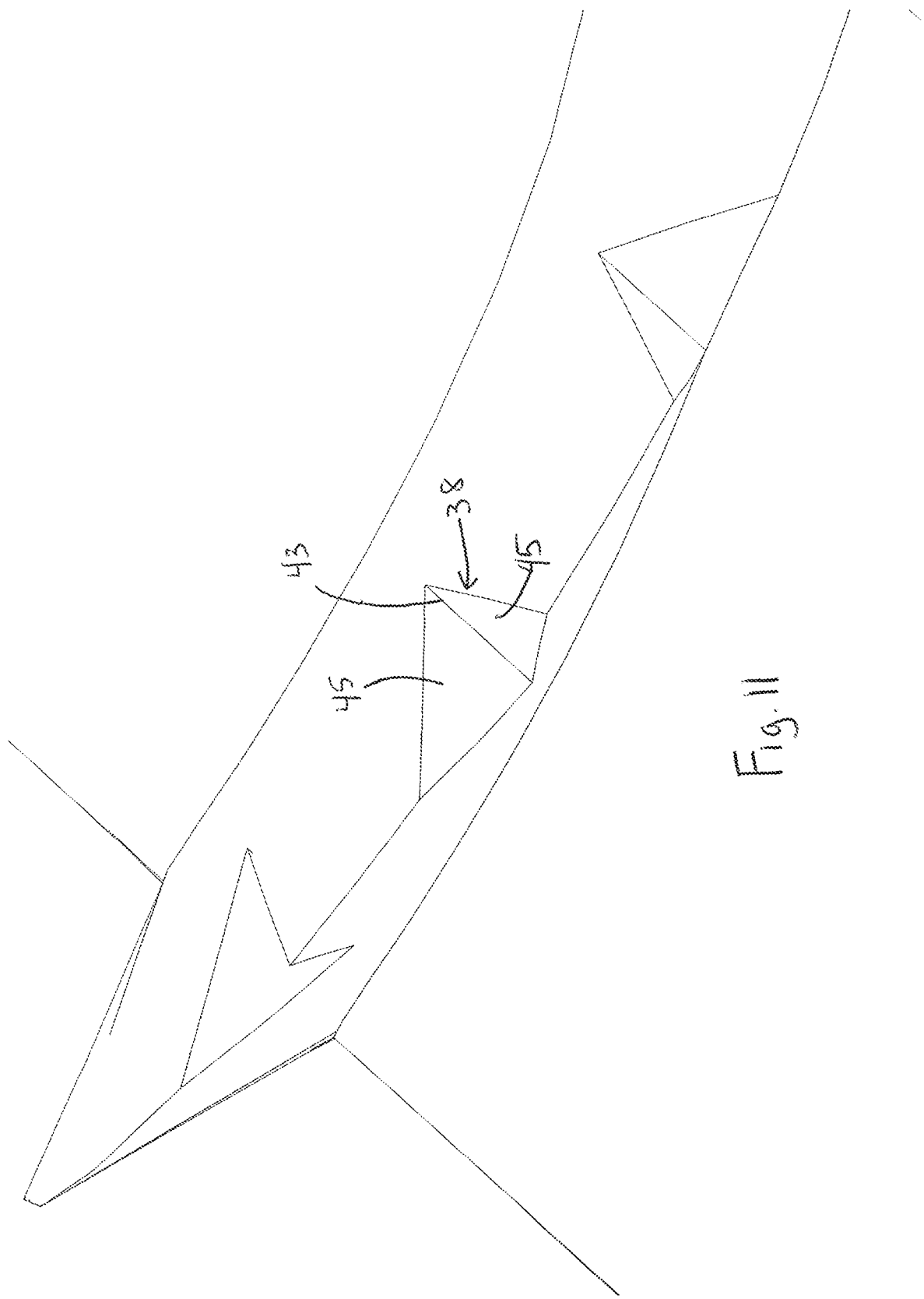
FIG. 11 shows a partial perspective view of the screw thread with notches.
Figure 12:
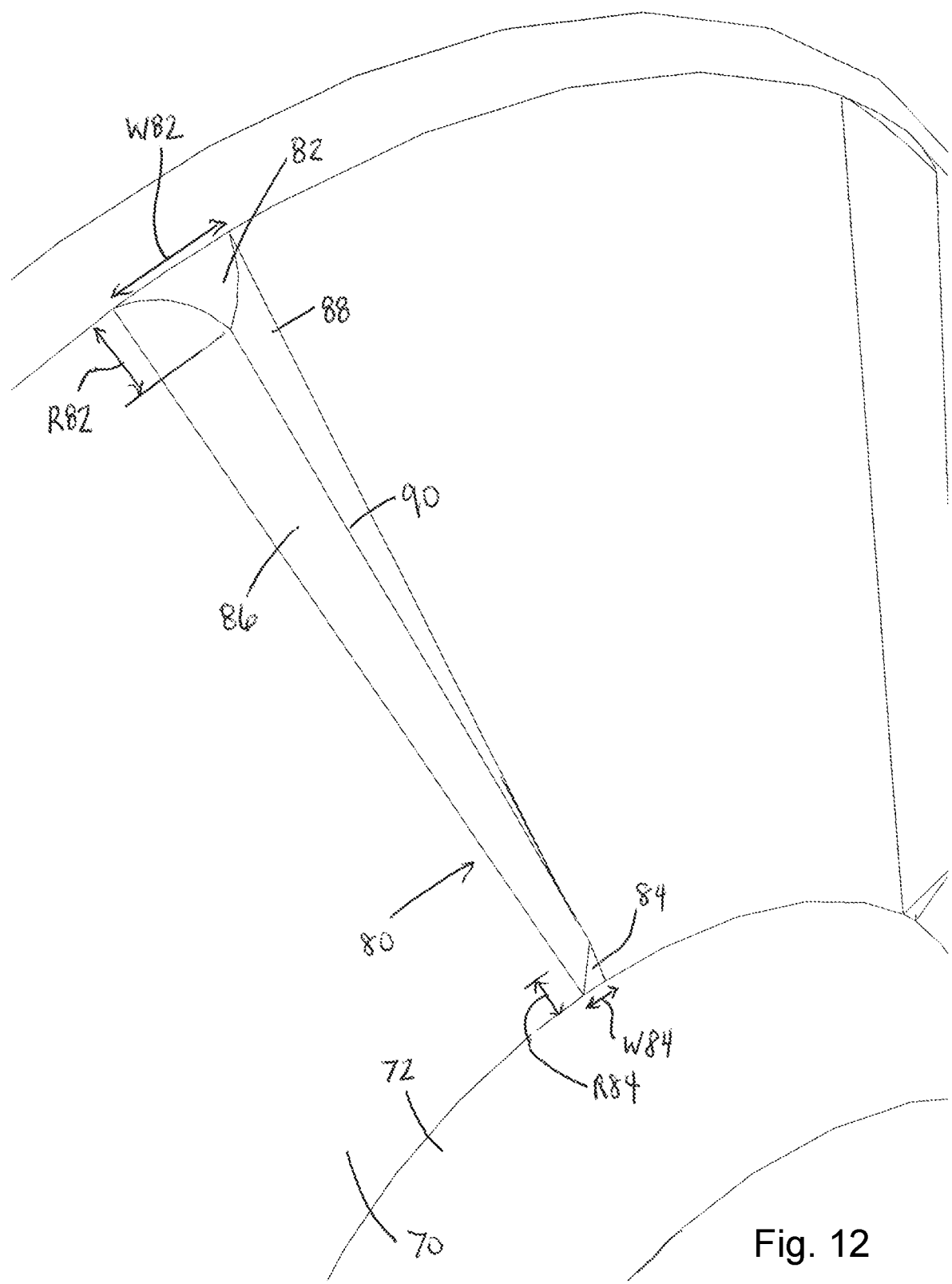
FIG. 12 shows a partial perspective of the underside of the screw head.

Referring to FIGS. 1-12, one embodiment of a screw 10 is shown. The screw includes a head end 12, a shank or core 14 and a tapered end 16. The head end 12 includes a tool engaging part 18 (e.g., in the form of a drive receiving recess) and is located at one end of the shank 14. As used herein the term shank refers to the elongated core or shaft or the screw, which can include threaded and unthreaded portions. The tapered end 16 is located at an opposite end of the shank 14 and terminates in a point 20. By way of example, the taper angle α1 defining the point 20 may be between about nineteen and about twenty-eight degrees (such as about twenty to twenty-five degrees, such as about twenty-one to twenty-three degrees). This angle range provides a good start for initial penetration into wood material when driving the screw. To further enhance the performance of the pointed tip, the tip may be formed with a maximum radius of 0.008 inches (e.g., typically in the range of 0.001 to 0.014 inches, such as the range of 0.003 to 0.008 inches). This tip configuration provides easier engagement into the substrate and faster penetration, resulting in overall less effort for a contractor to install the screw.

A thread 22 begins on the tapered end 16 (e.g., either at the very tip or slightly short of the tip), extends onto the shank 14 and terminates at a set location 24 short of the head end 12. The thread 22 is a right-hand thread as shown, and has a peripheral edge 30 formed where a leading flank 26 meets a trailing flank 28. In one implementation, the thread is symmetric, with a leading flank angle and a trailing flank angle that are both in the range of about eighteen to twenty-two degrees (e.g., about twenty degrees), for a total thread angle of between thirty-six to forty-four degrees. Other variations are possible. Generally, a total thread angle of between thirty and forty-five degrees will provide a screw with higher pull-out force and reduction in required driving torque, which consumes less drill battery energy. In another implementation, the thread is asymmetric with leading angle bigger than the trailing angle. Designing the thread angle to this specification will increase joint strength in wood assembly. The asymmetric thread angle will provide for higher pull-out force and provide a joint assembly with better strength.

A helical portion or extent 32 of the peripheral edge 30 includes a plurality of notch regions 34 spaced apart from each other by respective notch free regions 36. The notch-free regions may all be aligned linearly and in parallel with an axis 41 of the screw shank, or may be circumferentially offset from each other slightly with each subsequent helical turn of the thread. Each notch region 34 extends through a circumferential angle of between about two-hundred and eighty (280) degrees and about three-hundred and twenty (320) degrees (such as between about 295 degrees and 305 degrees, such as about 300 degrees) and includes a plurality of side-by-side notches 38 (e.g., V-notches) formed in the peripheral edge 30 of the thread, where the notches are spaced apart equally from each other. Here, nine or ten notches 38 may be included in each region 34, but the number could vary higher or lower.

In one example, the notches may be formed as substantially V-shaped notches that are oriented substantially perpendicular to the thread helix angle Φ3 of the thread 22, which angle Φ3 may be between about ten degrees and about twenty-five degrees (e.g. about eighteen to twenty-two degrees), where the helix angle is the cut angle of the thread relative to a plane 39 perpendicular to the central axis 41 of the thread. Alternatively, the V-notches may be oriented to run parallel to the central axis 41. In this regard, in the context of the present application the term "V-shaped" as used in relation to thread peripheral edge notches means that the notch is formed as a V-shaped recess or cutout along the peripheral edge, which may have a sharp point at the bottom of the V-shape, a flat at the bottom of the V-shape or a curvature at the bottom of the V-shape. The orientation of a V-shaped notch 38 is defined as the direction of a line formed by the base or bottom 43 of the V-shape of the notch (which line runs parallel to the sides 45 of the V-shape of the notch). The term "substantially perpendicular to the helix angle" means oriented at 90 degrees relative to the helix angle, ±5 degrees for tolerance. The V-shaped notches may enhance the cutting action of the primary thread as the screw is rotated into a material. The V-shaped notches may also reduce the resistance and torque to seat the screw.

Each notch free region 36 may extend through a circumferential angle of between about forty (40) degrees and about eighty (80) degrees (such as between about 55 and 65 degrees, such as about 60 degrees) and lacks any notches (such that the edge 30 is continuous in such regions 36). Notably, the notch free regions 36 may be distributed linearly along the helical portion 32 in parallel with central axis, or alternatively may be distributed such that a line sequentially traversing a mid-point of each of the V-notch free regions 36 extends in a left-hand helical path about the shank 14 (e.g., and at a helix angle which may be between about eighty (80) degrees and about sixty-five (65) degrees (e.g., 90 degrees minus the angle Φ3)).

In the illustrated embodiment, the thread 22 includes another helical portion or extent 42 extending from helical portion or extent 32 to the set location 24, where helical portion 42 is completely free of any notches along the peripheral edge. However, in other variations the notch arrangement (i.e., repeating sequence of notch regions 34 and notch-free regions 36) could run substantially the full length of the thread 22 (e.g., encompassing the length of both illustrated extents 32 and 42, or encompassing at least 80% of the full length of the thread 22, such as 90% or more) or could run from a location on or near the tapered end and substantially to the set location 24.

In one implementation, the thread 22 has a pitch P of between about 0.065 inches and 0.070 inches, a major diameter $D_M$ of between about 0.180 and about 0.190 inches and a minor diameter $D_m$ of between about 0.115 and 0.125 inches. In another implementation, the thread 22 has a pitch P of between about 0.105 inches and 0.115 inches, a major diameter $D_M$ of between about 0.180 and about 0.190 inches and a minor diameter $D_m$ of between about 0.115 and 0.125 inches. In another implementation, the thread 22 has a pitch P of between about 0.105 inches and 0.115 inches, a major diameter $D_M$ of between about 0.190 and about 0.210 inches and a minor diameter $D_M$ of between about 0.125 and 0.140 inches. In another implementation, the thread 22 has a pitch P of between about 0.105 inches and 0.115 inches, a major diameter $D_M$ of between about 0.165 and about 0.185 inches and a minor diameter $D_m$ of between about 0.100 and 0.120 inches. These values can vary according to screw diameter.

The tapered end 16 includes a ninety degree axial cut 100 running from the tip 20.

Here, the unthreaded portion 75 of the shank 14 includes a diameter $D_{75}$ that is slightly larger than the diameter Dm of the threaded portion 77 of the shank. For example, diameter D75 may be between about 0.130 and about 0.140 inches. Here, an axial length $L_{75}$ of the unthreaded portion 75 is less than the combined axial length $L_{77}$ of the threaded shank portion 77 and tapered end 16. For example, in one embodiment $L_{77}$ may be in the range of between about 1.350 and about 1.450 inches, and $L_{75}$ may be in the range of between about 0.880 and about 1.120 inches. In another embodiment. $L_{77}$ may be in the range of between about 1.440 and about 1.480 inches and $L_{75}$ may be in the range of between about 1.360 and about 1.430 inches. However, other variations are possible. The axial length L75 of the unthreaded portion 75 may be no more than about ninety percent (such as no more than eighty-five percent or no more than eighty percent) of the combined axial length L77.

The head end 12 includes an underside with a frustoconical part 70, which joins to the shank 14 via an intermediate frustoconical part and 72. Frustoconical part 70 tapers from the face in which tool engaging recess is located 18 toward the shank 14 at a head angle α2. In one embodiment head angle α2 may be between about forty-four (44) degrees and about forty-eight (48) degrees, such as between about forty-five (45) and forty-six (46) degrees) relative a central axis 41 of the screw shank, which results in a total head angle α2T of twice α2 (e.g., between about eighty-five and one-hundred degrees, such as between about eighty-eight degrees and about ninety-six degrees, such as between about ninety and ninety-two degrees). The larger head angle will provide an increase in pull-through force, resulting better joint strength assembly and preventing loosening. This enables the drive recess to be made deeper for better drive engagement, but still provides sufficient head wall thickness. In another embodiment head angle α2 may be between about thirty-nine and forty-one degrees. Frustoconical neck part 72 tapers from the edge of frustoconical part 70 to the shank 14 at a neck angle α3, which may be between about ten (10) and about 12 (12) degrees), relative to the central axis 41, which results in a total neck angle of twice α3 (e.g., between about eighteen degrees and about twenty-five degrees). Notably, the axial length of neck part 72 is substantially less than the axial length of head part 70, such as less than 50% of the axial length of head part 70. The relatively small neck length and neck angle increases the strength of the joint between the head and the shank inside wood assembly.

A plurality of outwardly protruding spaced apart nibs 80 are located at the underside of the head along frustoconical part 70. Here, six nibs 80 are shown, but other variations are possible, such between as four and eight nibs. Each nib 80 has one end 82 proximate the face of the head end (or proximate the tool engaging part) and extends toward the shank 14 to an opposite end 84. In the illustrated embodiment the nib end 84 is located along the line or plane of intersection of the frustoconical part 70 with frustoconical part 72. Each nib 80 has opposite sides or faces 86 and 88 that meet at an intersection line or ridge 90.

As used herein the terminology "proximate the tool engaging part" when referring to the end of the nib means within an axial distance of 0.05 inches of the face in which the tool engaging recess is located. As shown in the drawings, each nib extends both in a direction that includes a component parallel to an axis of the screw and a component radially inward toward a center axis of the screw Each nib 80 has a base width (i.e., a width at the surface of frustoconical part 70) that varies from a larger width W82 at end 82 and tapers to a lesser width W84 at end 84. In one example, width W84 is no more than fifty percent of width W82. Each nib 80 has a leading face 86 and a trailing face 88 that meat to define a nib ridge 90. The leading face is defined as the nib face that faces toward the rotational direction for driving the screw into a material (in this case the clockwise direction when looking at the end face of the head end of the screw). The nib ridge 90 has a height (measured orthogonal to the frustoconical surface of tapered portion 70) that varies from a larger height R82 at end 82 and decreases to a lesser height R84 at end 84. In one example, height R84 is no more than fifty percent of height R82.

As shown, the configuration of leading face 86 and trailing face 88 may be different. In particular, the leading face 86 is substantially concave and the trailing face 8 is substantially convex.

The nibs 86 provide a self-countersink operation prior to full seating of the screw. The nibs can also assist in locking the screw into place, increasing break away torque.

It is to be clearly understood that the above description is intended by way of illustration and example only, is not intended to be taken by way of limitation, and that other changes and modifications are possible. For example, while certain relative dimensions have been provided by example above, variations are possible.

Figure 13:
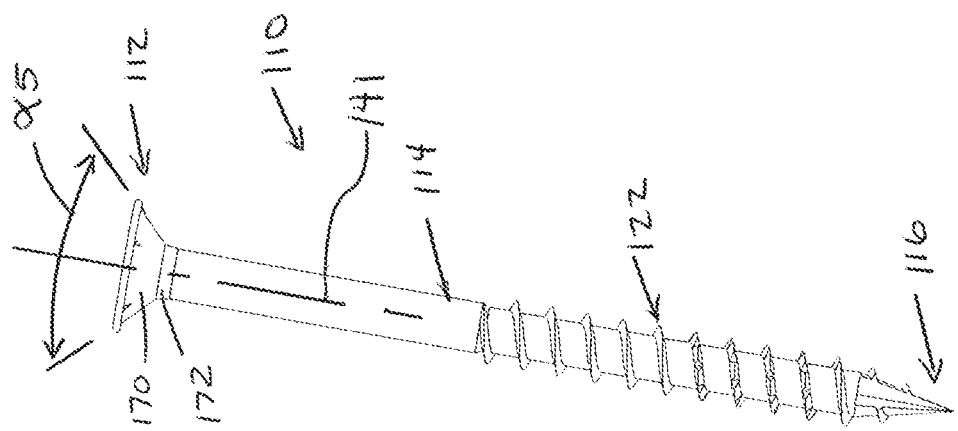
Figure 14:
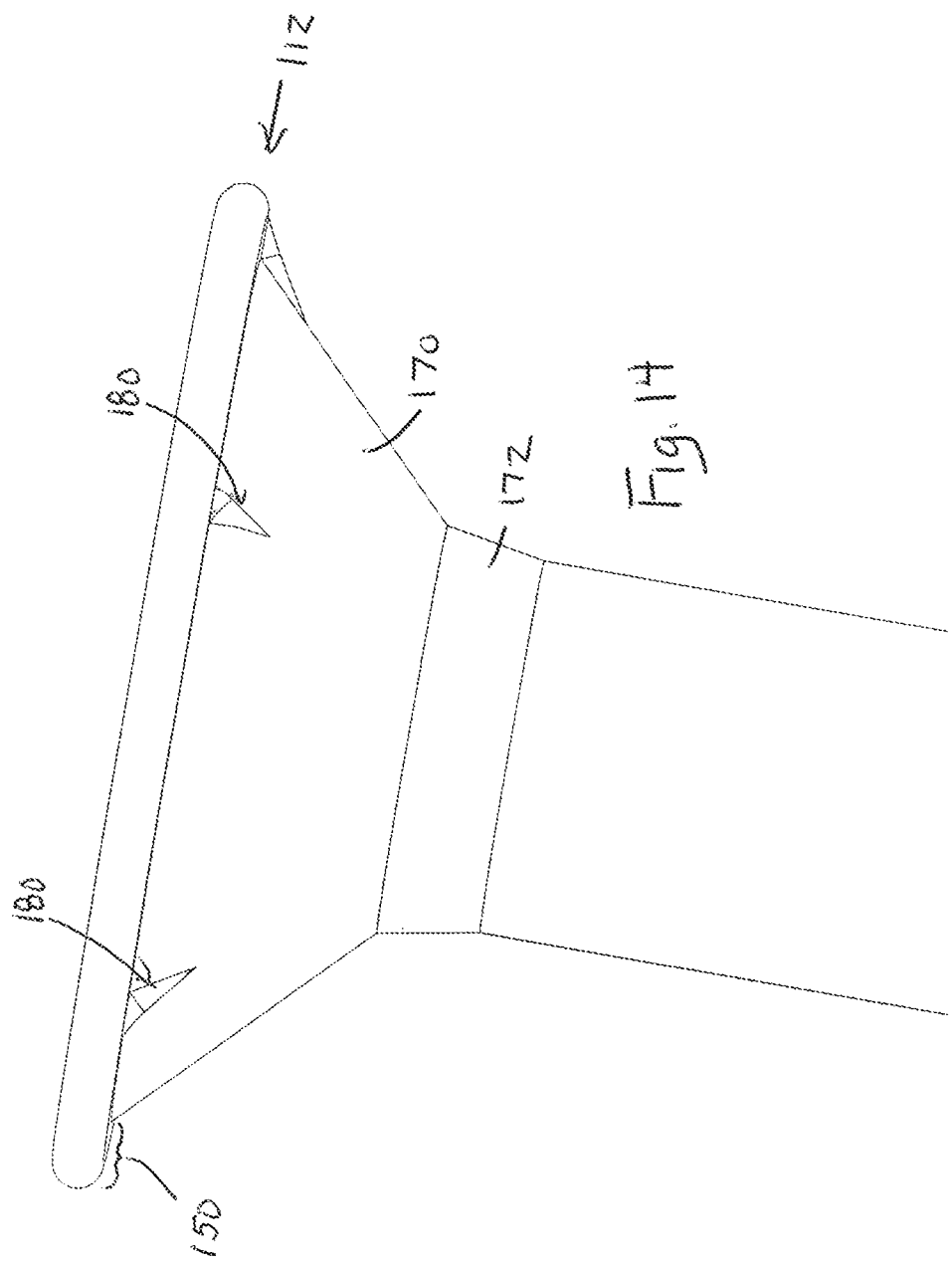
Figure 15:
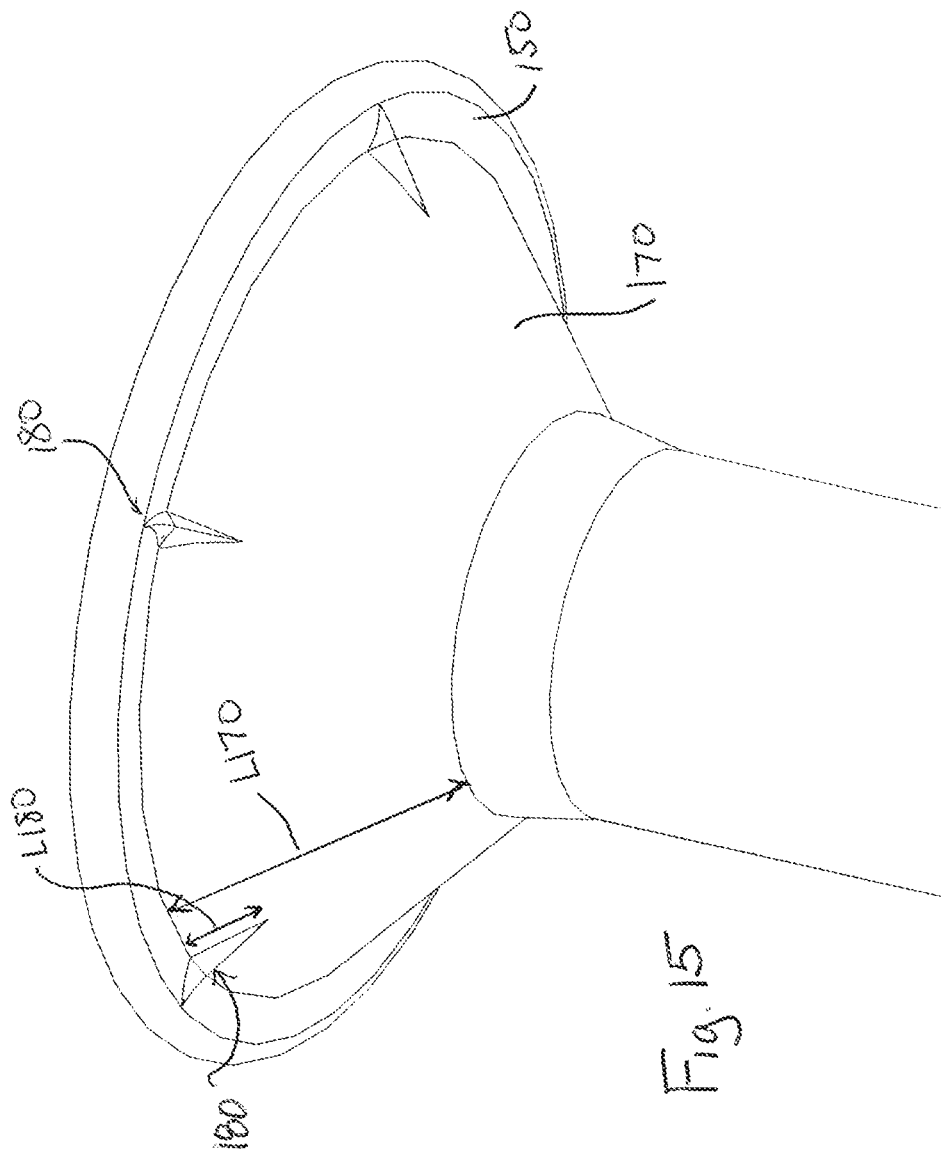

Further, and referring to FIGS. 13-19 another embodiment of a screw 110 is shown, which includes a shank 114, tapered end 116 and thread 122 configuration similar to that of above screw 10. In the case of screw 110, the head end 112 is configured differently. In particular, the head end 112 includes an annular ledge 150 about its perimeter at the face end, and the frustoconical part 170 of the head does not extend to the radially outer edge of the ledge 150. The ledge configuration increase pull-through force and provides a unique feature for framing in construction, which requires higher joint strength. The ledge feature provides a more flat surface area of engagement between the underside of the screw head and the substrate, and thus increases resistance force against the substrate. In one implementation the annular dimension D150 of the ledge may be between about 5% and 20% of the total head diameter D112. Ledge 150 may provide a resistance toward pull-through loading conditions of the screw, and stronger head design for holding higher loads. The head end 112 includes a combination of a countersunk head portion (formed primarily by part 170) and a wafer head portion (formed primarily by ledge 150). The total head angle α5 may be similar to that described above for screw 10, and the neck part 172 may be of similar angle and axial length to the described above for neck part 72.

The nibs 180 are different in configuration than nibs 80 above. In particular, nibs 180 only extend a slight distance down the head part 170 toward the neck part 172. Here, nib length L180 in a direction parallel with the surface of head part 170 is no more than one-half the length L170 (e.g., no more than one-third the length L170). Each nib also includes a segment 180-1 that extends along the ledge 150 as shown. The leading face 200 of nib segment 180-1 is concave and the trailing face 202 convex. With respect to nib segment 180-2, which is located primarily on head part 170, the leading face 204 and trailing face 206 may both be substantially planar or only slightly curved.

In one implementation, the thread 22 has a pitch P of between about 0.105 inches and 0.115 inches, a major diameter $D_M$ of between about 0.180 and about 0.190 inches and a minor diameter $D_m$ of between about 0.115 and 0.125 inches. In another implementation, the thread 122 has a pitch of between about 0.105 inches and 0.115 inches, a major diameter of between about 0.190 and about 0.210 inches and a minor diameter of between about 0.125 and 0.140 inches. In another implementation, the thread 122 has a pitch of between about 0.105 inches and 0.115 inches, a major diameter of between about 0.165 and about 0.185 inches and a minor diameter of between about 0.100 and 0.120 inches.

Referring now to FIGS. 20-23 another embodiment of a screw 210 is shown, which includes a shank 214, tapered end 216 and thread 222 configuration similar to that of above screw 10. In the case of screw 210, the head end 212 is configured differently, particularly as to the nib configuration. The frustoconical head part 270 may form a total head angle similar to that described above for screw 10, and the neck part 272 may be of similar angle and axial length to the described above for neck part 72. In alternative implementations the frustoconical head part may include a total head angle that is between about seventy-eight and eighty-four degrees, such as between about eighty and eighty-two degrees.

The nibs 280 are different in configuration than nibs 80 above. In particular, nibs 280 spiral as they extend along the frustoconical head part 270 toward the neck part 272, with the spiral running with the direction of rotational installation of the screw. The leading face 286 of each nib is generally planar and the trailing face 288 includes more curvature, which is concave in nature. The nibs 280 narrow when moving from end 282 to end 284, and the height of the nib ridge 290 shortens when moving from end 282 to end 284.

In one implementation, the thread 322 has a pitch of between about 0.105 inches and 0.115 inches, a major diameter of between about 0.165 and about 0.185 inches and a minor diameter of between about 0.100 and 0.120 inches.

Referring now to FIGS. 24-27 another embodiment of a screw 310 is shown, which includes a shank 314, tapered end 316 and thread 322 configuration similar to that of above screw 10. In the case of screw 310, the head end 312 is configured differently, particularly as to the nib configuration. The frustoconical head part 370 may form a total head angle similar to that described above for screw 10, and the neck part 372 may be of similar angle and axial length to the described above for neck part 72. In alternative implementations the frustoconical head part may include a total head angle that is between about seventy-eight and eighty-four degrees, such as between about eighty and eighty-two degrees.

The nibs 380 are different in configuration than nibs 80 above. In particular, nibs 380 spiral as they extend along the frustoconical head part 370 toward the neck part 372, with the spiral running opposite to the direction of rotational installation of the screw. The trailing face 388 of each nib is generally planar and the leading face 386 includes more curvature, which is concave in nature. The nibs 380 narrow when moving from end 382 to end 384, and the height of the nib ridge 390 shortens when moving from end 382 to end 384.

In one implementation, the thread 422 has a pitch of between about 0.105 inches and 0.115 inches, a major diameter of between about 0.165 and about 0.185 inches and a minor diameter of between about 0.100 and 0.120 inches.

Referring now to FIGS. 28-31 another embodiment of a screw 410 is shown, which includes a shank 414, tapered end 416 and thread 422 configuration similar to that of above screw 10. In the case of screw 410, the head end 412 is configured differently, particularly as to the nib configuration. The frustoconical head part 470 may form a total head angle similar to that described above for screw 10, and the neck part 472 may be of similar angle and axial length to the described above for neck part 72. In alternative implementations the frustoconical head part may include a total head angle that is between about seventy-eight and eighty-four degrees, such as between about eighty and eighty-two degrees.

The nibs 480 are different in configuration than nibs 80 above. In particular, nibs 380 are more block-shaped and extend onto neck part 472. The trailing face 488 of each nib is generally planar and the leading face 486 is generally planar. The nibs 480 narrow when moving from end 482 to end 484, and the height of the nib ridge 490 shortens when moving from end 482 to end 484. Here, the height at end 484 is negligible, with the nib tapering into the shank. The nib ridge 490 is also a surface portion of a frustum, rather than a simple ridge line. The frustum angle of nib parts 480-1 on head part 470 is θ1, and the frustum angle of nib parts 480-2 on neck part 472 is θ2, with θ1 substantially greater than θ2. In one example, angle θ2 is higher than the total head angle of head part 470 and may be between about eighty and eighty-eight degrees, such as between about eighty-three and eighty-five degrees.

Referring to FIG. 32, another embodiment of a screw 510 is shown, which is similar to screw 10, but also incorporates a set of flute threads 502 (e.g., here five flue threads). The flute threads start at axial location 503 and extend toward the unthreaded portion of the shank. Here, the unthreaded portion of the shank has a smaller relative length to the overall screw length than the unthreaded portion 75 in screw 10. The flute threads 502 overlap with several turns of the main thread 522 (e.g., here about three or four turns), and between about forty percent and sixty percent of an axial length of each flute thread overlaps with the main thread 522.

It is recognized that other variations, modifications and additions are possible.

What is claimed is:

1. A screw, comprising:
a head end, a shank and a tapered end,
the head end including an end face with a tool engaging recess, the head end located at one end of the shank and the tapered end located at an opposite end of the shank,
wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion,
wherein the head end includes an underside formed by a frustoconical part with a plurality of nibs and an annular ledge extending radially outward beyond a perimeter of the frustoconical part and defining a flat surface area for increasing pull-through force;
wherein the frustoconical part defines a total head angle of between eighty-five degrees and one-hundred degrees for increasing, pull-through force and enhancing joint assembly strength;
wherein a frustoconical neck connects the head end to the shank and runs from the shank to the frustoconical part, and the frustoconical neck defines a total neck angle of between eighteen degrees and twenty-five degrees;
wherein each nib has a nib length in a direction parallel with a surface of the frustoconical part, wherein the nib length is no more than one-third a length of the surface of the frustoconical head part.

2. The screw of claim 1 wherein the thread is symmetric and includes a leading flank and a trailing flank that each form a respective flank angle of between eighteen to twenty-two degrees.

3. The screw of claim 1 wherein the thread is symmetric and includes a leading flank and a trailing flank that collectively form a total thread angle of between thirty and forty-five degrees for increasing pull-out force and reducing required driving torque.

4. The screw of claim 1 wherein the thread is asymmetric and includes a leading flank and a trailing flank, the trailing flank forms a flank angle of between eleven to eighteen degrees, the leading flank forms a flank angle of between twenty-three to thirty-five degrees for increasing pull-out force and improving joint assembly strength.

5. The screw of claim 1 wherein the tapered end defines a taper angle of between nineteen and twenty-eight degrees.

6. The screw of claim 5 wherein the tapered end terminates in a tip having a maximum radius of 0.014 inches.

7. The screw of claim 1 wherein each nib includes a concave leading face and a convex trailing face.

8. A screw, comprising:
a head end, a shank and a tapered end,
the head end including a tool engaging part, the head end located at one end of the shank and the tapered end located at an opposite end of the shank,
wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head end includes an end face and an underside formed by a frustoconical part, and further includes an annular ledge extending radially outward beyond a perimeter of the frustoconical part and defining a flat surface area for increasing pull-through force;

wherein the underside includes a plurality of nibs circumferentially spaced apart from each other, wherein each nib includes a first segment primarily on the annular ledge and a second segment primarily on the frustoconical part;

wherein each nib has a nib length along a surface of the frustoconical part and in a direction parallel with the surface of the frustoconical part, wherein the nib length is no more than one-third a length of the surface of the frustoconical head part;

wherein the frustoconical part defines a total head angle of between eighty-five degrees and one-hundred degrees for increasing pull-through force and enhancing joint assembly strength.

9. The screw of claim 8 wherein a frustoconical neck connects the head end to the shank, and the frustoconical neck defines a total neck angle of between eighteen degrees and twenty-five degrees.

10. A screw, comprising:

a head end, a shank and a tapered end, the head end including a toot engaging part, the head end located at one end of the shank and the tapered end located at an opposite end of the shank, wherein a thread is formed along the shank, the thread begins on the tapered end, extends onto the shank and terminates at a set location short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head end includes an end face and an underside formed by a frustoconical part, and further includes an annular ledge extending radially outward beyond a perimeter of the frustoconical part and defining a flat surface area for increasing pull-through force;

wherein the underside includes a plurality of nibs circumferentially spaced apart from each other, wherein each nib includes a first segment primarily on the annular ledge and a second segment primarily on the frustoconical part;

wherein each nib has a nib length along a surface of the frustoconical part and in a direction parallel with the surface of the frustoconical part, wherein the nib length is no more than one-third a length of the surface of the frustoconical head part;

wherein a leading face of the first segment is concave and a trailing, face of the first segment is convex;

wherein a leading face of the second segment is substantially planar and a trailing face of the second segment is substantially planar.

11. A screw, comprising:

a head end, a shank and a tapered end, the head end including a tool engaging part, the head end located at one end of the shank and the tapered end located at an opposite end of the shank, wherein a thread is formed along the shank, the thread begins on the tapered end, extends onto the shank and terminates at a set location, short of the head end, the thread being a right-hand thread and having a peripheral edge, at least a first helical portion of the peripheral edge includes a plurality of notches and a second helical portion of the thread lacks any notches, wherein the first helical portion is closer to the tapered end than the second helical portion, wherein the head end includes an end face and an underside formed by a frustoconical part, and further includes an annular ledge extending radially outward beyond a perimeter of the frustoconical part and defining a flat surface area for increasing pull-through force;

wherein the underside includes a plurality of nibs circumferentially spaced apart from each other, wherein each nib includes a first segment primarily on the annular ledge and a second segment primarily on the frustoconical part;

wherein each nib has a nib length along a surface of the frustoconical part and in a direction parallel with the surface of the frustoconical part, wherein the nib length is no more than one-third a length of the surface of the frustoconical bead part;

wherein the plurality of nibs consists of five nibs, and the underside lacks any nibs in circumferential regions between the five nibs.

* * * * *

UNITED STATES PATENT AND TRADEMARK OFFICE
CERTIFICATE OF CORRECTION

PATENT NO. : 11,105,361 B2
APPLICATION NO. : 16/168154
DATED : August 31, 2021
INVENTOR(S) : Lajewardi et al.

Page 1 of 1

It is certified that error appears in the above-identified patent and that said Letters Patent is hereby corrected as shown below:

In the Claims

In Claim 10, at Column 9, Line 27 reads:
"the head end including a toot engaging part,"
It should read:
--the head end including a tool engaging part,--

In Claim 11, at Column 10, Line 41 reads:
"frustoconical bead part;"
It should read:
--frustoconical head part;--

Signed and Sealed this
Second Day of November, 2021

Drew Hirshfeld
*Performing the Functions and Duties of the
Under Secretary of Commerce for Intellectual Property and
Director of the United States Patent and Trademark Office*